(12) United States Patent
DeVoe

(10) Patent No.: US 10,948,127 B2
(45) Date of Patent: Mar. 16, 2021

(54) TREE-MOUNTABLE BRACKET FOR CANISTER STOVE OR OTHER CAMPING EQUIPMENT

(71) Applicant: Shane A. DeVoe, Royal Oak, MI (US)

(72) Inventor: Shane A. DeVoe, Royal Oak, MI (US)

(73) Assignee: Outdoor Products, Inc., Fenton, MI (US)

(*) Notice: Subject to any disclaimer, the term of this patent is extended or adjusted under 35 U.S.C. 154(b) by 89 days.

(21) Appl. No.: 16/027,353

(22) Filed: Jul. 4, 2018

(65) Prior Publication Data

US 2019/0293233 A1    Sep. 26, 2019

Related U.S. Application Data

(60) Provisional application No. 62/529,421, filed on Jul. 6, 2017.

(51) Int. Cl.
*F16M 13/02* (2006.01)
*A45F 3/00* (2006.01)
(Continued)

(52) U.S. Cl.
CPC ............ *F16M 13/022* (2013.01); *A45F 3/00* (2013.01); *F16B 2/08* (2013.01); *F16B 2/10* (2013.01);
(Continued)

(58) Field of Classification Search
CPC ... F16M 13/022; A45F 3/00; A45F 2003/001; F16B 2/08; F16B 2/10; F24C 15/30; A01M 31/02
See application file for complete search history.

(56) References Cited

U.S. PATENT DOCUMENTS 3,173,642 A * 3/1965 Greenspan ............... G10G 5/00
248/170
3,353,629 A * 11/1967 Brunes .................. A01M 31/02
182/20

(Continued)

FOREIGN PATENT DOCUMENTS

WO     2010138381    12/2010

OTHER PUBLICATIONS

Lone Wolf Stands, Alpha Tech F1 | Blog | Lone Wolf Stands, Oct. 6, 2014, http://web.archive.org/web/20141006171816/http://www.lonewolfhuntingproducts.com:80/publisher/blog/2014/1/6/alpha-tech-f1-new-for-2014.

(Continued)

*Primary Examiner* — Tan Le
(74) *Attorney, Agent, or Firm* — Spectrum Intellectual Property Law; David P. Kohn

(57) ABSTRACT

The present invention contemplates an apparatus for, and methods of, securing a bracket or similar device to a support object, such as a tree trunk or pole or post, for the purpose of using said bracket to hold objects, particularly small portable objects such as canister stoves used as camping equipment by campers, backpackers, or outdoorsmen.
Embodiments of the bracket comprise interlocked pieces which form a platform which receives a payload. Embodiments of the apparatus have rotating, pivoting pieces which can hold a payload in place. Notches or slots on the apparatus are usable to tie a rope or cord through, which can become wedged into the notches or slots, and this rope or cord can be wrapped around a support object. Frictional surfaces or protrusions on the apparatus assist in gripping the support object. Embodiments of the apparatus can be either folded or disassembled into flat, stackable pieces.

1 Claim, 33 Drawing Sheets

(51) Int. Cl.
*F16B 2/08* (2006.01)
*F16B 2/10* (2006.01)
*F24C 15/30* (2006.01)

(52) U.S. Cl.
CPC ........ *F24C 15/30* (2013.01); *A45F 2003/001* (2013.01)

(56) References Cited

U.S. PATENT DOCUMENTS

| | | | | |
|---|---|---|---|---|
| 3,372,688 | A | * | 3/1968 | Moore ................. F24C 15/107 126/24 |
| 3,746,294 | A | | 7/1973 | Johnston |
| 3,767,011 | A | * | 10/1973 | Witt ...................... A01M 31/02 182/187 |
| 3,960,134 | A | * | 6/1976 | Scott ...................... F24C 15/36 126/24 |
| 4,448,186 | A | * | 5/1984 | Smith ..................... F24C 15/10 126/214 D |
| 4,674,597 | A | * | 6/1987 | Humphrey ............ A63B 27/00 182/189 |
| 4,708,221 | A | | 11/1987 | Kubiak |
| 5,622,342 | A | | 4/1997 | Mills |
| 6,202,964 | B1 | | 3/2001 | Thornhill |
| 7,908,716 | B2 | | 3/2011 | Sorensen |
| 2006/0249648 | A1 | | 11/2006 | DeVoe |
| 2010/0275757 | A1 | * | 11/2010 | Hallet .................... F16L 3/127 84/318 |
| 2011/0126382 | A1 | * | 6/2011 | Kirkham ............ A61B 17/1322 24/16 R |
| 2012/0137475 | A1 | | 6/2012 | Seader |
| 2012/0180267 | A1 | | 7/2012 | LeBeau |

OTHER PUBLICATIONS

Devoe, Shane A., Concept Design for a Folding, Portable Camp Stove Mount That Can Be Attached Via Rope or Cord to a Tree, notarized document, Mar. 10, 2011, presented to Angela C. Williams, Oakland County, Michigan.

Devoe, Shane A., Public use of invention, Aug. 2010, Absarokee Beartooth Wilderness, Montana.

Devoe, Shane A., Public use of invention, Jun. 2012, Isle Royale National Park, Michigan.

Devoe, Shane A., Public use of invention, Aug. 2013, Isle Royale National Park, Michigan.

Devoe, Shane A., Public use of invention, Sep. 2014, Flat Top Mountains, Colorado.

* cited by examiner

TREE-MOUNTABLE BRACKET FOR CANISTER STOVE OR OTHER CAMPING EQUIPMENT

RELATED APPLICATIONS

The present application claims priority from U.S. Provisional Application No. 62/529,421, filed on Jul. 6, 2017.

STATEMENT REGARDING FEDERALLY SPONSORED RESEARCH

Not applicable.

BACKGROUND OF THE INVENTION

1. Field of the Invention

The present invention relates to an apparatus for, and methods of, securing a bracket or similar device to a support object, such as a tree trunk or pole or post, for the purpose of using said bracket to mount or hold useful objects, particularly small portable objects such as canister stoves used by campers or backpackers.

2. Description of the Related Art

Campers and outdoorsmen will often benefit from being able to use certain equipment. One example of such equipment is a portable campers' stove. A canister camp stove, which is well known in the art, allows campers to heat and cook food in conjunction with a pot, pan, or tray which is placed on top of the stove. The use of such a stove, though, can be inconvenient or difficult if a camper or backpacker is only able to use it on the ground, as this requires bending, squatting, crouching, or sitting down every time the stove must be operated; additionally, canister stoves or other camp stoves might present fire hazards when used on the ground.

As such, it can make things much more convenient for campers to have a horizontal stand, platform, mount, or other such surface which can hold their camping equipment. Surfaces available in the wilderness, though, are generally much more limited than those in more developed or urban areas, because furniture such as tables, desks, or even chairs are not readily available in the outdoors, and it would be prohibitive or impossible for campers or backpackers to take them along.

An example of an existing solution to this problem involves securing a platform to an elevated section of a nearby post or tree trunk, allowing users to operate a stove or other equipment from a convenient position. Current solutions involve using screws or ropes, or both, to secure such a platform at a desired height or elevation. However, the use of screws for stability has several disadvantages; screws can damage the post or tree trunk, they require users to carry extra equipment such as screwdrivers, and screws lack the ability to penetrate harder support objects such as metal poles.

The prior art contains other devices which have a number of disadvantages. Many of these devices require damage to a tree, post, or other support object. Additionally, many existing devices require knots to be tied in order to secure a platform. Also, many existing devices are adapted to bear weight on an upper component, which pulls the devices away from a tree or other support object and thereby puts extra pressure on a rope, cord, screw, or other holding component. In addition, many existing devices lack customized features which are specifically adapted to interface with standard-sized canister stoves. Many existing devices also lack portability, either due simply to large size or to an inability to separate these devices into smaller or flatter components.

SUMMARY OF THE INVENTION

Briefly described, the invention comprises apparatuses for and methods of providing a platform that can be secured to a tree or other support, where this platform is capable of holding a payload such as a canister stove.

Advantages of the present invention include the use of one or more frictional components; this allows a device to be secured to support objects such as metal poles, which screws or similar components of the type used in the prior art would not be able to penetrate. Moreover, the use of one or more friction grips to secure the present invention prevents damage to tree trunks or support posts, and allows use of the device without special tools.

Another advantage of the present invention includes the capability of being usable with one or more sizes of payloads, such as large standard-sized camper stoves and/or small standard-sized camper stoves. Embodiments of the invention can include adaptations which can hold a payload in place, such as by catching and holding it. Examples of this include, but are not limited to, one or more barriers, notches and/or latches which catch and hold the lower rim of a camping stove.

In some embodiments, the present invention includes one or more components which are adapted to fit one or more sizes of payloads. In some embodiments, these payloads can comprise standard-sized fuel canisters of camping canister stoves. In some embodiments, these standard-sized fuel canisters can either be large-sized or small-sized.

In some embodiments, the present invention includes one or more payload latches which are adapted to interface with a payload, such as a lower rim of a stove fuel canister. In some embodiments, these one or more payload latches operate by rotation. In some embodiments, these one or more payload latches comprise a cam component.

In some embodiments, the present invention includes one or more payload barriers which are adapted to interface with a payload. In some embodiments, these payload barriers are adapted to catch and/or hold a payload in place. In some embodiments, one or more of these payload barriers can take the form of payload notches. In some embodiments, these payload barriers and/or payload notches are shaped to adapt with certain categories of payloads, such as the lower rim of a stove fuel canister.

In some embodiments, one or more payload latches and/or one or more payload barriers are mutually positioned at distances from each other that allow them to interface with specifically-sized payloads. In some embodiments, these one or more payload latches and/or one or more payload notches are mutually positioned to interface with a standard small-sized stove fuel canister, a standard large-sized stove fuel canister, and/or other sizes of stove fuel canisters. In some embodiments, a component of one or more of the payload barriers and/or payload notches is adapted to be positioned above the lower rim of a stove fuel canister in order to prevent upward motion.

In some embodiments, the apparatus comprises multiple sets of payload barriers, one set of which is positioned closer to one or more payload latches, and another set of which is set farther away from one or more payload latches, so that the apparatus can interface with more than one size of payload—for example, either a large-sized or a small-sized stove fuel canister—depending on which size payload a user places on the apparatus. In these embodiments, a "set" refers to one or more payload barriers and/or payload notches.

In some embodiments, the present invention includes a specially adapted set of rotating, pivoting latches which can be shaped to interface with standard-sized stove fuel canisters and to hold them securely in place. These rotating, pivoting latches can also have multiple levels which will hold a larger-sized fuel canister and stove on a first level, or a smaller-sized fuel canister and stove on a second level, depending on which size fuel canister/stove combination a user places onto the device. In some embodiments, the first level can be an upper level and the second level can be a lower level.

In some embodiments, the present invention comprises foldable elements, which allow the apparatus to be either folded or rotated into a configuration which is flatter and/or takes up less space. In some embodiments, these foldable elements can comprise one or more hinged elements.

In some embodiments, the present invention comprises support strings which connect a lower component to an upper section, and which help to bear the weight of the lower component and/or whatever payload might be placed on the apparatus. In some embodiments, the lower component comprises a platform or other location on which a payload can be placed.

In some embodiments, the present invention includes the ability to disassemble the device into flat, stackable components for easier, more compact storage and transport. When the device is reassembled, these components might be secured to one another using one or more rotating assembly catches.

In some embodiments, the present invention includes an upper part comprising a series of notches or slots through which a rope, twine, cord or string can be wrapped or wedged, so as to secure the apparatus to a tree or other support without the need to tie knots. These notches or slots could be oriented in alternating, opposite directions for enhanced stability. These slots or notches can also have slanted or tapered sides which gradually become narrower, in order to facilitate the rope, twine, cord, or string wedging into place when the notch or slot becomes sufficiently narrow.

In some embodiments, the present invention includes a lower part which comprises a frictional grip and a payload platform. The payload platform might comprise two or more cross-pieces. One or more of these cross-pieces might comprise one or more rotating, pivoting latches to aid in securing a payload which is placed on the payload platform. The frictional grip could comprise a shaped surface which is adapted for traction and might comprise a serrated surface, spikes, spurs, evenly shaped teeth or serrations, unevenly shaped teeth or serrations, a cleat, or other protrusions.

In some embodiments, the present invention includes the ability to lock a canister stove or other payload in place through the use of a rotating, pivoting latch. The rotating, pivoting latch might be adapted for payloads of multiple sizes. For example, such a latch could comprise an upper hook designed to surround the bottom rim of a standard large-sized stove fuel canister, and could also comprise a lower hook—set further in compared to the upper hook—designed to surround the bottom rim of a standard small-sized stove fuel canister. In such a case, whether the upper hook or the lower hook engages will depend on which size stove fuel canister stove a user places on top of the apparatus.

Another advantage of the present invention is additional stability, which is created by locating a rope attachment on an upper section of a device and a platform on a lower section of the device. This design causes the lower section to exert increased pressure against an adjacent tree trunk or other support object when a load such as a stove assembly is added, as opposed to pressure of the type found in prior art designs where a platform is located on a device's upper section and where weight placed on this platform, such as a stove assembly, pulls the upper section away from an adjacent support object.

The present invention comprises an apparatus for being secured to a support object while holding a payload, said apparatus comprising: an upper component adapted for interfacing with a rope or cord, and a lower component which comprises a frictional surface and a platform.

In some embodiments, the frictional surface of the lower component comprises a shaped surface which is adapted for traction.

In some embodiments, the shaped surface comprises a serrated surface, spikes, spurs, evenly shaped teeth or serrations, unevenly shaped teeth or serrations, a cleat, or other protrusions.

In some embodiments, the upper component comprises a number of slots.

In some embodiments, the slots comprise slot openings and internal sections, wherein the slots are narrower in the internal sections than in the slot openings.

In some embodiments, the slots become narrower through gradual tapering.

In some embodiments, one or more of the slots are oriented in alternating, opposite directions.

In some embodiments, the platform comprises two or more cross-pieces.

In some embodiments, one or more of the cross-pieces comprise one or more rotating, pivoting latches.

In some embodiments, one or more of the rotating, pivoting latches comprise an upper hook and a lower hook, where the lower hook is set further toward a center of the cross-piece and the upper hook is set farther away from a center of the cross-piece.

In some embodiments, one or more of the rotating, pivoting latches comprise a lower catch and an upper catch, where the lower catch is set further toward the center of the cross-piece and the upper catch is set farther away from the center of the cross-piece, and also where the lower catch is positioned under the lower hook and the upper catch is positioned under the upper hook, and where a payload pressing downward on either catch will cause the rotating, pivoting latch to rotate and will cause the upper hook or the lower hook to become positioned over or around part of the payload.

In some embodiments, a protrusion on one or more of the rotating, pivoting latches can function as both an upper catch and a lower hook.

In some embodiments, the platform comprises one or more payload barriers which are positioned to interface with a payload.

In some embodiments, the one or more payload barriers comprise notch shapes.

In some embodiments, the platform comprises one or more payload latches.

In some embodiments, the one or more payload latches operate by rotation.

In some embodiments, one or more of the payload latches comprise a cam component.

In some embodiments, one or more support elements connect the lower component to the upper component.

In some embodiments, the one or more support elements comprise one or more strings and/or wires.

In some embodiments, the one or more support elements comprise one or more rigid members.

In some embodiments, adaptations of the one or more support elements allow the upper component to be folded onto the lower component.

In some embodiments, the adaptations of the one or more support elements comprise knobs and/or hinges.

In some embodiments, the apparatus is separable into flat, stackable pieces.

In some embodiments, the flat, stackable pieces can be secured together through the use of one or more rotating assembly catches.

A method embodiment of the present invention allows the securing of a payload-holding device to a support object, comprising the steps of: placing the payload-holding device at a desired position against a side of the support object, placing a rope or cord in a notch, slot, or hole of a rope attachment on one side of the payload-holding device, moving free parts of the rope or cord around a tree trunk, pole, post, or another support object, and wrapping the rope or cord through notches, slots, or holes of a rope attachment on an opposite side of the payload-holding device.

In some method embodiments, one or more of the notches, slots or holes comprise slot openings and internal sections, wherein the slots are narrower in the internal sections than in the slot openings.

In some method embodiments, one or more of the notches, slots or holes become narrower through gradual tapering.

In some method embodiments, one or more of the notches, slots or holes are oriented in alternating, opposite directions.

Some method embodiments will comprise the additional step of: pulling the rope or cord with sufficient force to wedge it into narrow sections of the notches, slots or holes.

An additional method embodiment of the present invention allows latching a canister stove or other payload onto a payload-holding device, comprising the steps of:
  positioning the payload above a platform component of the payload-holding device,
  lowering the payload down towards the platform component,
  pushing, with the bottom of the payload, a catch protrusion on a rotating, pivoting latch which is attached to the platform component, and
  rotating a hook on the rotating, pivoting latch over or around part of the payload.

An additional method embodiment of the present invention allows latching a canister stove or other payload onto a payload-holding device, comprising the steps of:
  positioning a payload against a set of one or more payload barriers, and
  engaging a payload latch which secures the payload.

In some method embodiments, one or more payload barriers take the shape of notches.

In some method embodiments, the payload latch is engaged through rotation.

BRIEF DESCRIPTION OF THE DRAWINGS

FIGS. 1A through 6C illustrate a first example embodiment of the invention, wherein the invention is implemented in the form of a bracket which is capable of disassembly into flat pieces.

FIG. 1A shows an exploded view of a first example embodiment of a bracket with its pieces disassembled.

FIG. 2 shows the bracket with a canister stove placed on it and locked into place, and also shows a rope which is secured to a hole in the bracket.

FIG. 6C shows a front perspective view of the bracket, secured to a tree trunk and with a canister stove placed on it, and with a pot mounted on top of the canister stove.

FIGS. 7A through 15 illustrate a second example embodiment of the invention, wherein the invention is implemented in the form of a folding bracket which is capable of folding into a flat configuration.

FIG. 7A shows a front perspective view of a second example embodiment of a folding bracket, in an unfolded configuration with a rope attached.

FIG. 12 shows a top view of a payload latch positioned on the folding bracket.

FIG. 15 shows a top perspective view of a lower frictional gripping component of the folding bracket.

DETAILED DESCRIPTION OF THE INVENTION

Figure 1A:
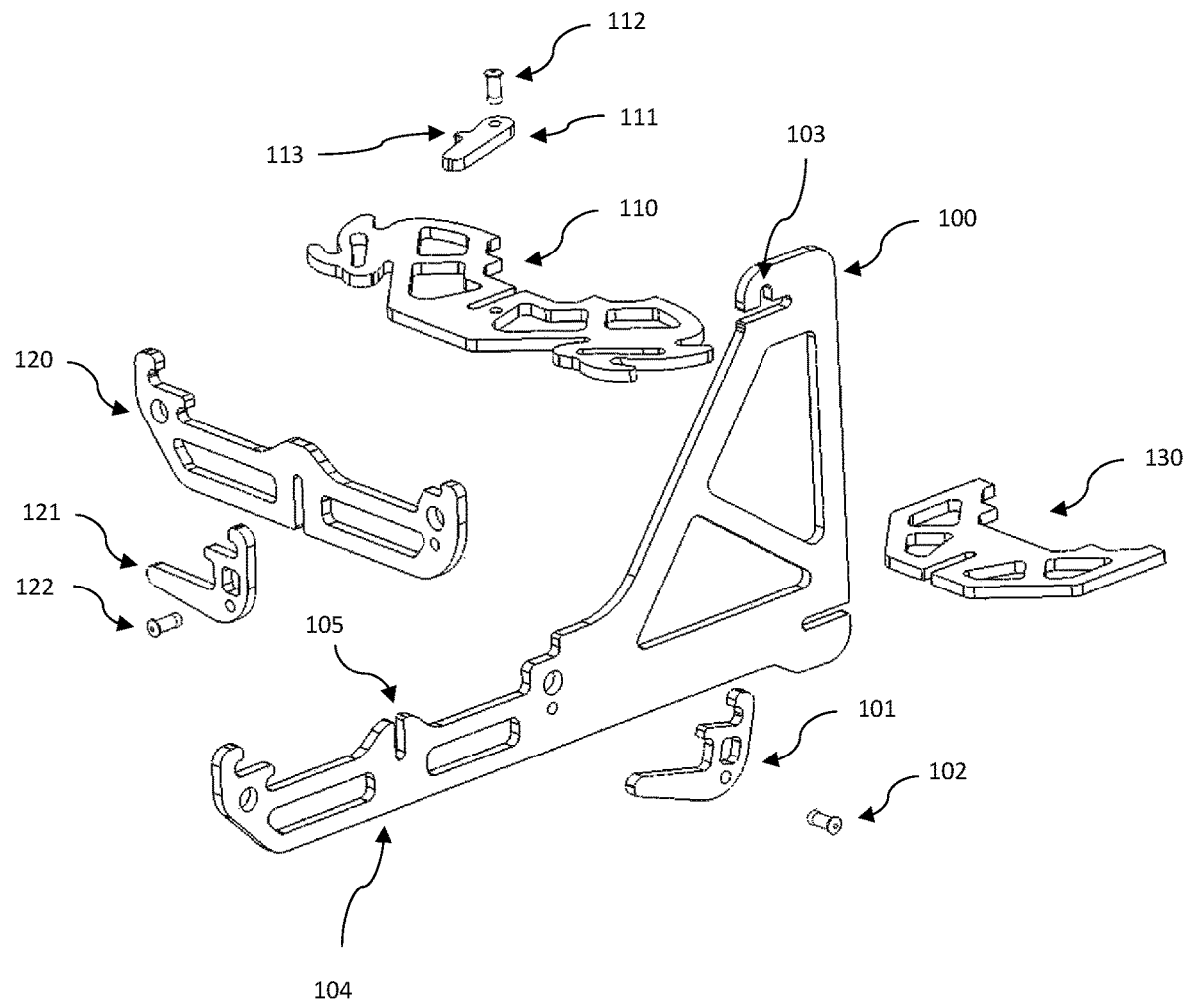

The following detailed description of the invention refers to the accompanying figures. The description and drawings do not limit the invention; they are meant only to be illustrative of example embodiments. Other embodiments are also contemplated without departing from the spirit and scope of the invention.

Referring now to the drawings, embodiments of the invention are shown and disclosed.

FIGS. 1A through 6C illustrate a first example embodiment of the invention, wherein the invention is implemented in the form of a bracket which is capable of disassembly into flat pieces.

FIG. 1A shows an exploded view of a first example embodiment of a bracket with its pieces disassembled. The bracket comprises a main body 100, an upper rope attachment piece 110, a crossbar 120, a lower frictional gripping piece 130, two rotating, pivoting latch pieces 101 and 121, two latch pivot bolts 102 and 122, an assembly catch piece 111, and an assembly catch pivot bolt 112. A platform for holding canister camping stoves or other payloads can be created by attaching the crossbar 120 to a bottom bar 104 on the main body 100, which is accomplished by interlocking a slot of the crossbar 120 with another slot 105 on the bottom bar 104. The resulting platform will comprise two bars arranged crosswise, one of which is the bottom bar 104 and the other one of which is the crossbar 120. In like manner, slots on the upper rope attachment piece 110 and the lower frictional gripping piece 130 can be interlocked into matching slots on the main body 100. Additionally, the rotating, pivoting latch piece 101 can be secured to the main body 100 by inserting the latch pivot bolt 102 through matching holes in the rotating, pivoting latch piece 101 and the main body 100; in like manner, the rotating, pivoting latch piece 121 can be secured to the crossbar 120 by inserting the latch pivot bolt 122 through matching holes in the rotating, pivoting latch piece 121 and the crossbar 120. Additionally, the assembly catch piece 111 can be secured to the upper rope attachment piece 110 by inserting the assembly catch pivot bolt 112 through matching holes in the assembly catch piece 111 and the upper rope attachment piece 110. Finally, a protrusion 113 on the assembly catch piece 111 is adapted to go into a notch 103 on the main body 100 after the bracket has been assembled. Note that various pieces of the bracket, when separate, can be stacked together in a compact manner due to their flat design and this can greatly facilitate storage and transport. Note also in this embodiment that the various pieces comprise holes and empty space, which results in lighter weight and enhances portability.

Figure 1B:
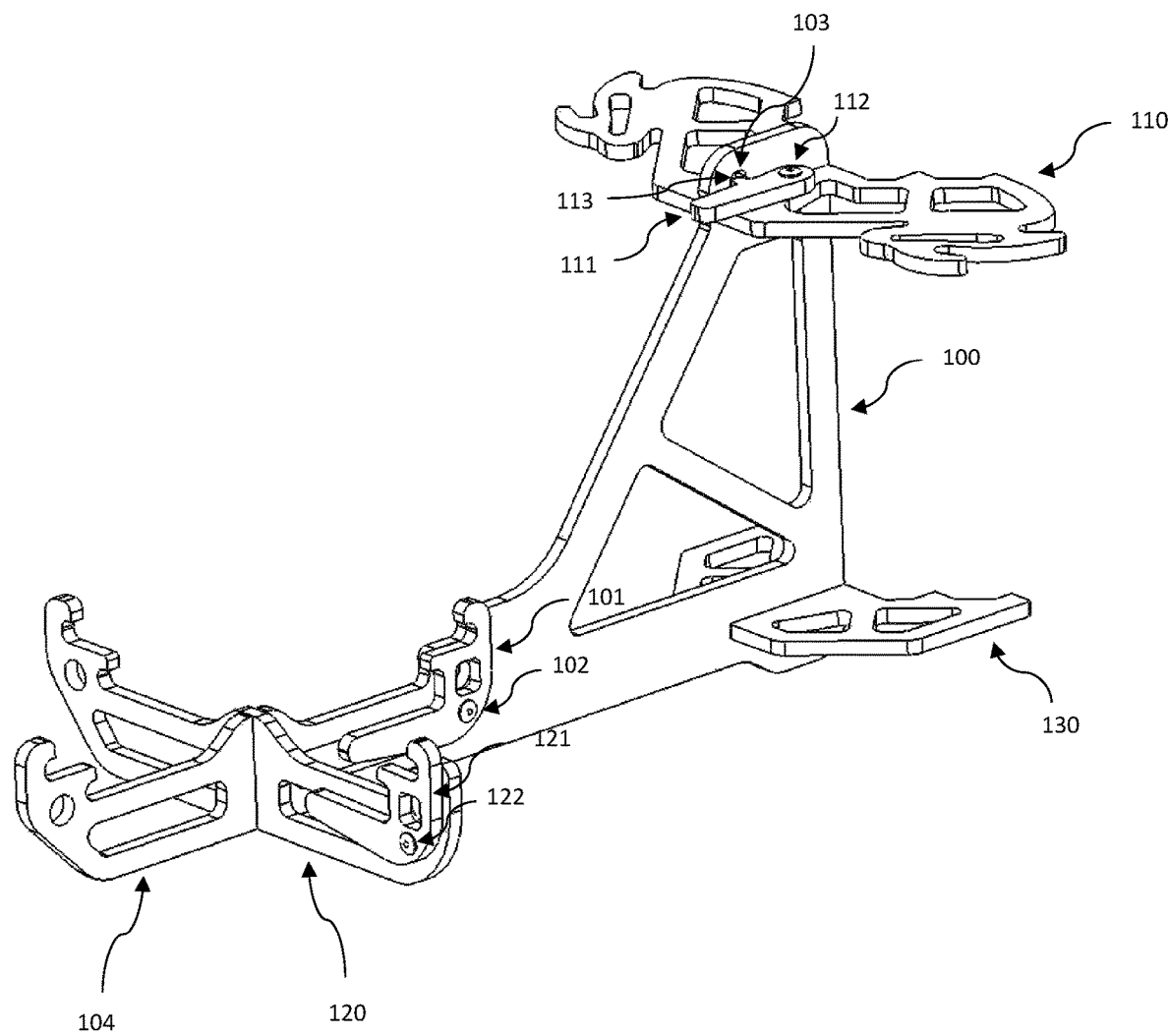
FIGS. 1B and 1C show the bracket from FIG. 1A after having been assembled.

FIG. 1B shows a view of the bracket from FIG. 1A after having been assembled. The upper rope attachment piece 110, the crossbar 120, and the lower frictional gripping piece 130 have all been attached to the main body 100 by interlocking their respective slots with matching slots on the main body 100. Additionally, the rotating, pivoting latch pieces 101 and 121 have been secured to the main body 100 and the crossbar 120, respectively, with the two latch pivot bolts 102 and 122. Additionally, the assembly catch piece 111 has been secured to the upper rope attachment piece 110 with the assembly catch pivot bolt 112. Finally, the assembly catch piece 111 has been rotated about assembly catch pivot bolt 112 in a manner that places the protrusion 113 into the notch 103 which is adapted to receive it; this provides an additional measure to secure the upper rope attachment piece 110 to the main body 100. Finally, the bottom bar 104 and the crossbar 120 now constitute a platform onto which canister stoves or other objects or payloads may be placed.

Figure 1C:
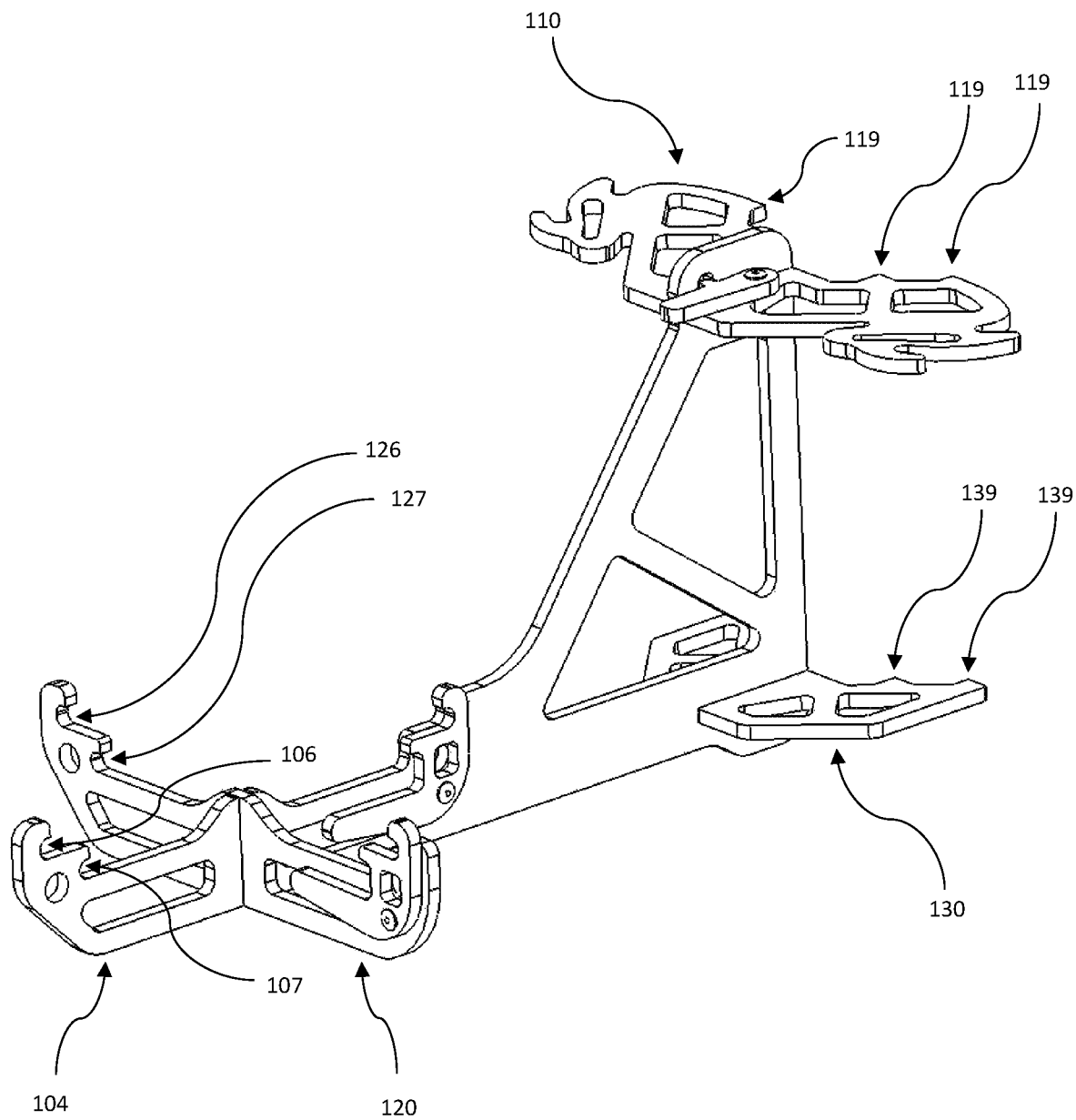

FIG. 1C highlights features of the bracket which are adapted to fit specific payloads, such as standard large-diameter and small-diameter fuel canister components of canister campers' stoves. Larger-diameter fuel canisters may be accommodated through use of an upper notch 106 on the bottom bar 104 and an upper notch 126 on the crossbar 120. Smaller-diameter fuel canisters may be accommodated through the use of a lower notch 107 on the bottom bar 104 and a lower notch 127 on the crossbar 120. Additionally, this figure also highlights frictional protrusions 119 on the upper rope attachment piece 110 and other frictional protrusions 139 on the lower frictional gripping piece 130; these frictional protrusions help the bracket to grip and maintain its position when tied to a tree, pole, or other support object.

Figure 2:
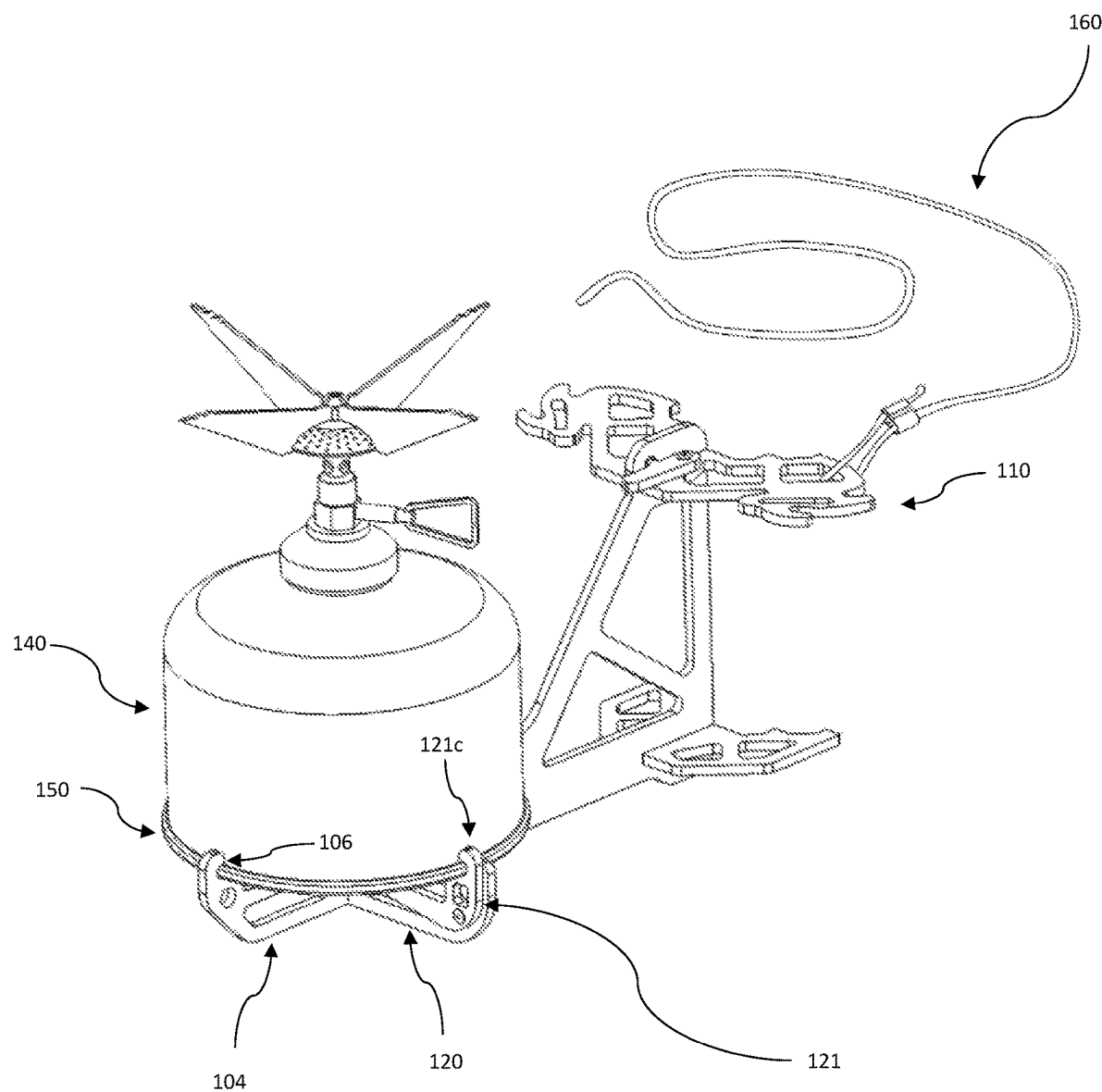

FIG. 2 shows the bracket with a canister stove 140 placed on it and locked into place. The canister stove 140 rests on a platform created by components of bottom bar 104 and crossbar 120, as well as components of rotating, pivoting latches 101 (not shown) and 121. The canister stove 140 in this figure comprises a fuel canister, which has a bottom rim 150 which is accommodated by an upper notch 106 on bottom bar 104 and also by a top protrusion 121c on rotating, pivoting latch 121. Note that in the event that a smaller-diameter fuel canister is used, it can be supported by resting directly on upper surfaces of the bottom bar 104 and the crossbar 120, and its bottom rim can fit within lower notches 107 and 127 (shown in FIG. 1C). This figure also shows a rope 160 which is secured to a hole in upper rope attachment piece 110; this can be used to secure the bracket to a tree trunk, stationary post, or other support object.

Figure 3A:
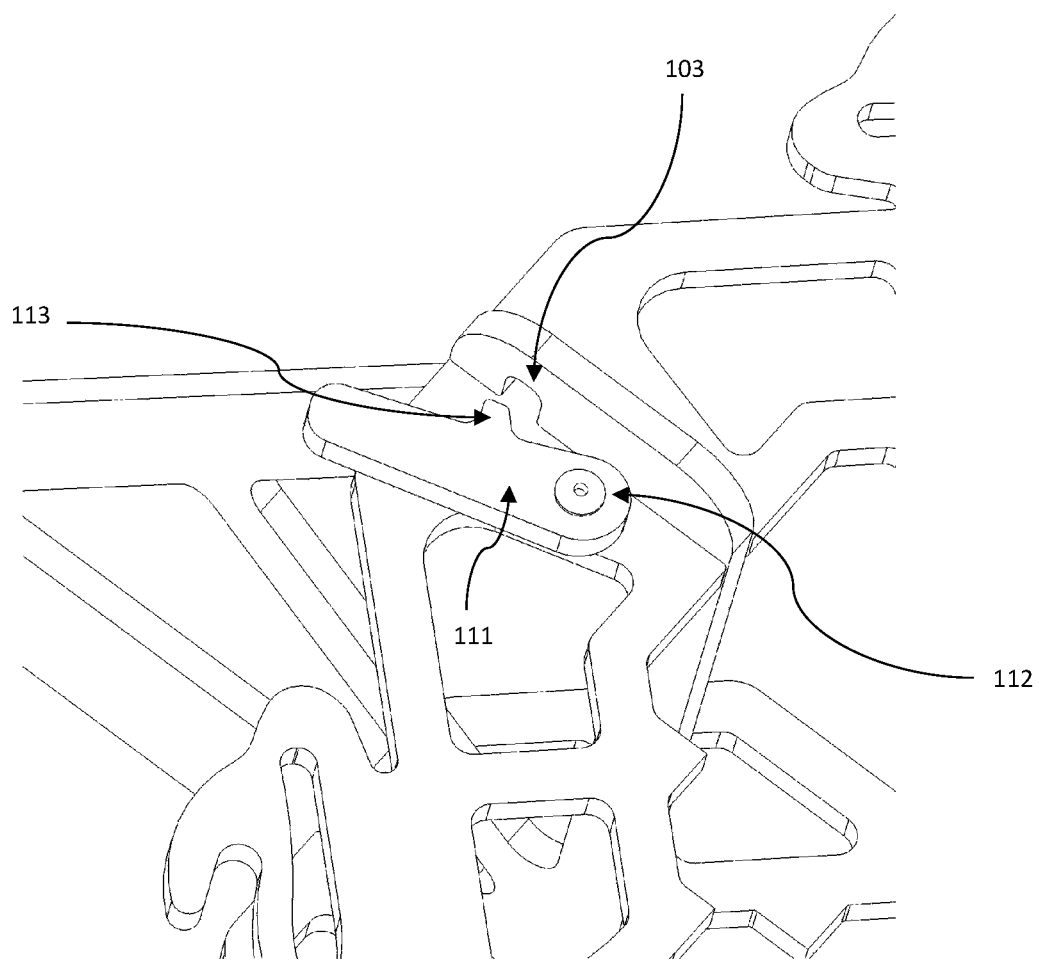
FIG. 3A shows a top view of the bracket, depicting an assembly catch piece in an open position.

FIG. 3A shows a top view of assembly catch piece 111 in an open position, and depicts a protrusion 113 which is adapted to go into a notch 103 when the assembly catch piece 111 is rotated about an assembly catch pivot bolt 112.

Figure 3B:
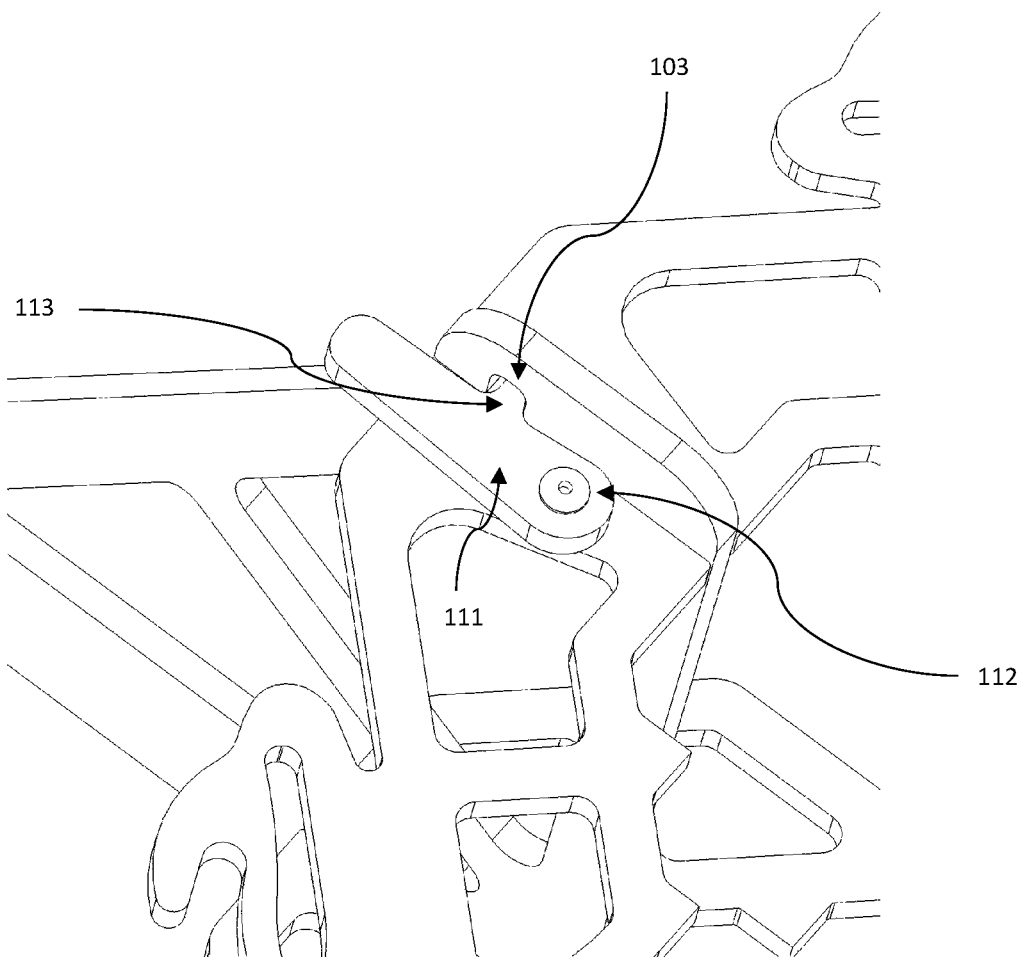
FIG. 3B shows a top view of the bracket, depicting an assembly catch piece in a closed position.

FIG. 3B shows a top view of assembly catch piece 111 in a closed position, and depicts how the protrusion 113 fits into the notch 103 when the assembly catch piece 111 is rotated about the assembly catch pivot bolt 112. This action provides extra stability by locking the upper rope attachment piece 110 to the main body 100 (shown in FIGS. 1A-1C).

Figure 4A:
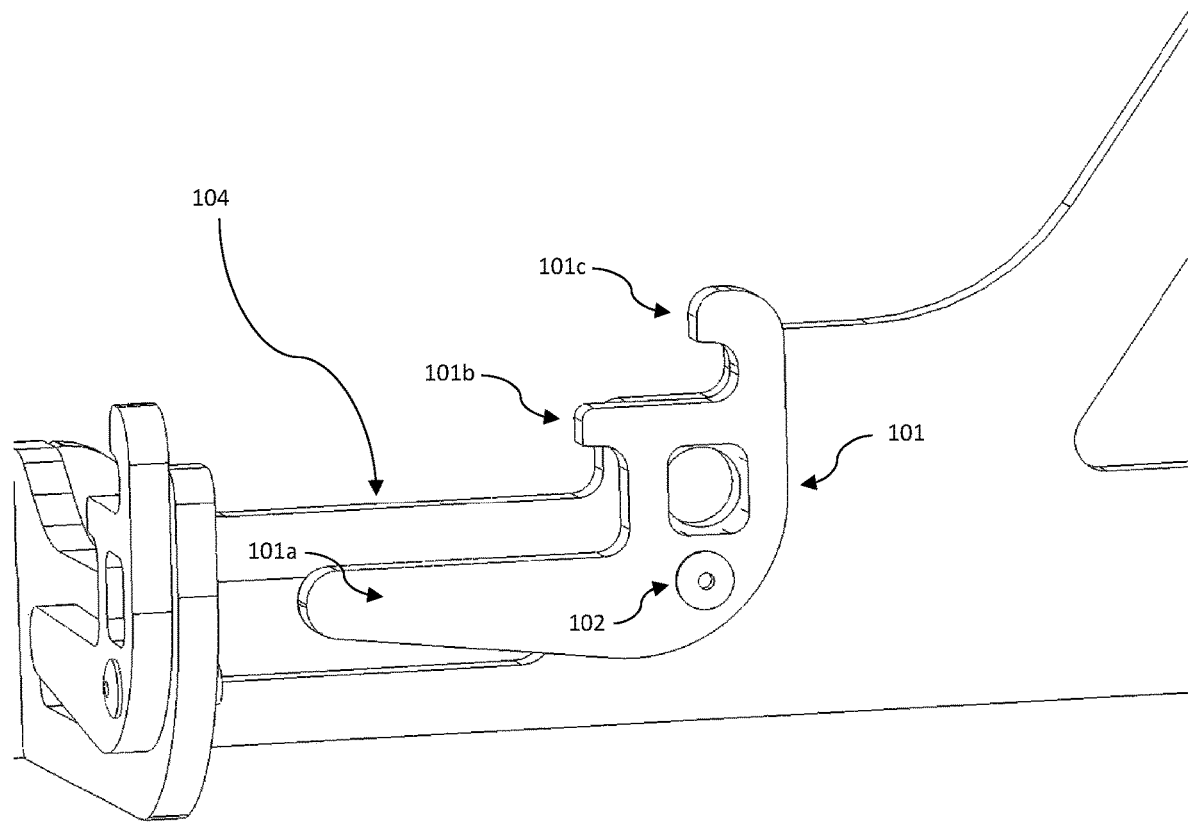
FIG. 4A shows a close-up view of the bracket, depicting a rotating, pivoting latch piece in a closed position.

FIG. 4A shows a close-up view of rotating, pivoting latch piece 101 in a closed position. The rotating, pivoting latch piece in this figure comprises a bottom protrusion 101a, a middle protrusion 101b, and a top protrusion 101c, and it is rotatable around a latch pivot bolt 102. In this embodiment, the shapes and positions of the bottom, middle, and top protrusions 101a, 101b, and 101c are chosen so as to accommodate standard large-sized and standard small-sized fuel canisters of canister camp stoves. In this embodiment, rotation of the rotating, pivoting latch piece 101 into a closed position can be accomplished manually; alternatively, it can occur when a large-diameter fuel canister is placed on the bracket and presses down on the middle protrusion 101b, or when a small-diameter fuel canister is placed on the bracket and presses down on the bottom protrusion 101a.

Figure 4B:
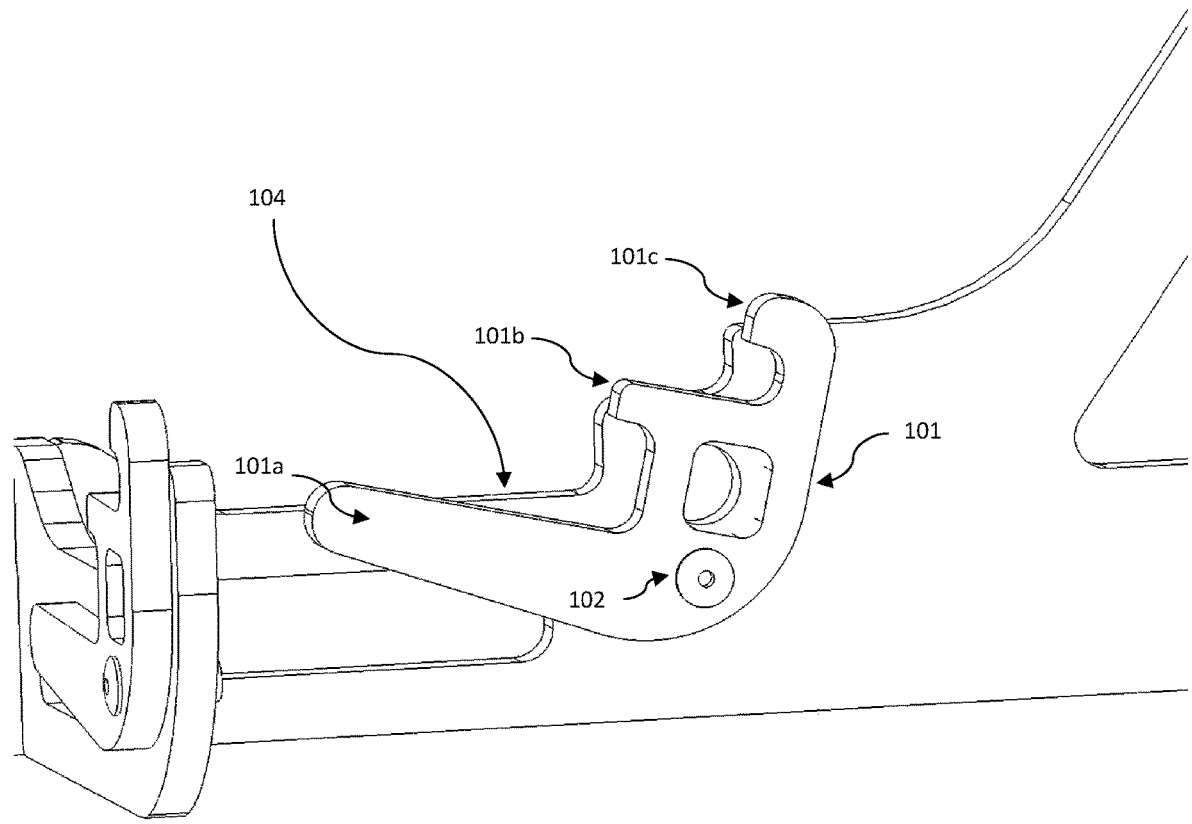
FIG. 4B shows a close-up view of the bracket, depicting a rotating, pivoting latch piece in an open position.

FIG. 4B shows a close-up view of rotating, pivoting latch piece 101 in an open position. In this position, the rotating, pivoting latch piece 101 has been rotated upwards around latch pivot bolt 102. This position can allow the bracket to receive payloads whose shapes allow them to interface with subcomponents of the rotating, pivoting latch piece 101, such as bottom, middle, and top protrusions 101a, 101b, and 101c.

Figure 4C:
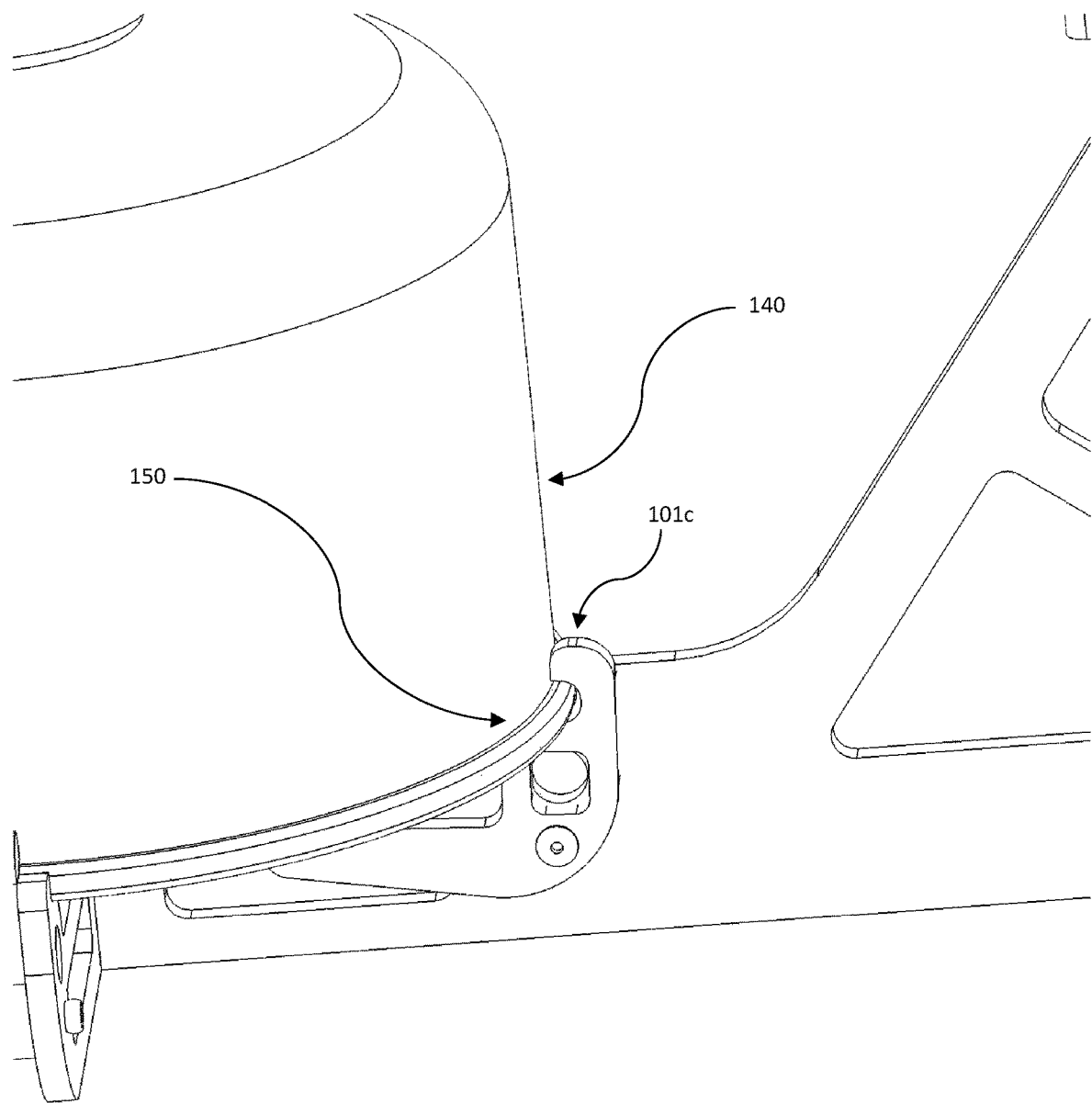
FIG. 4C shows a close-up view of the bracket after a fuel canister component of a canister stove has been placed on the bracket, and a rotating, pivoting latch piece has been closed around a bottom rim of the fuel canister.

FIG. 4C shows a close-up view of rotating, pivoting latch piece 101 after a canister stove 140 has been placed on the bracket and the rotating, pivoting latch piece 101 has been closed so that a top protrusion 101c now surrounds a bottom rim 150 of a fuel canister component of the canister stove 140. In this view, the canister stove 140, including its fuel canister component, rests on middle protrusion 101b of the rotating, pivoting latch piece 101. In this figure, the use of a canister camp stove with a standard large-sized fuel canister is contemplated. It will be appreciated that a smaller fuel canister can also be used, and in such a case it will rest on the bottom bar 104 (shown in FIGS. 1A-1C) instead of on the middle protrusion 101b (shown in FIGS. 4A and 4B).

Figure 5A:
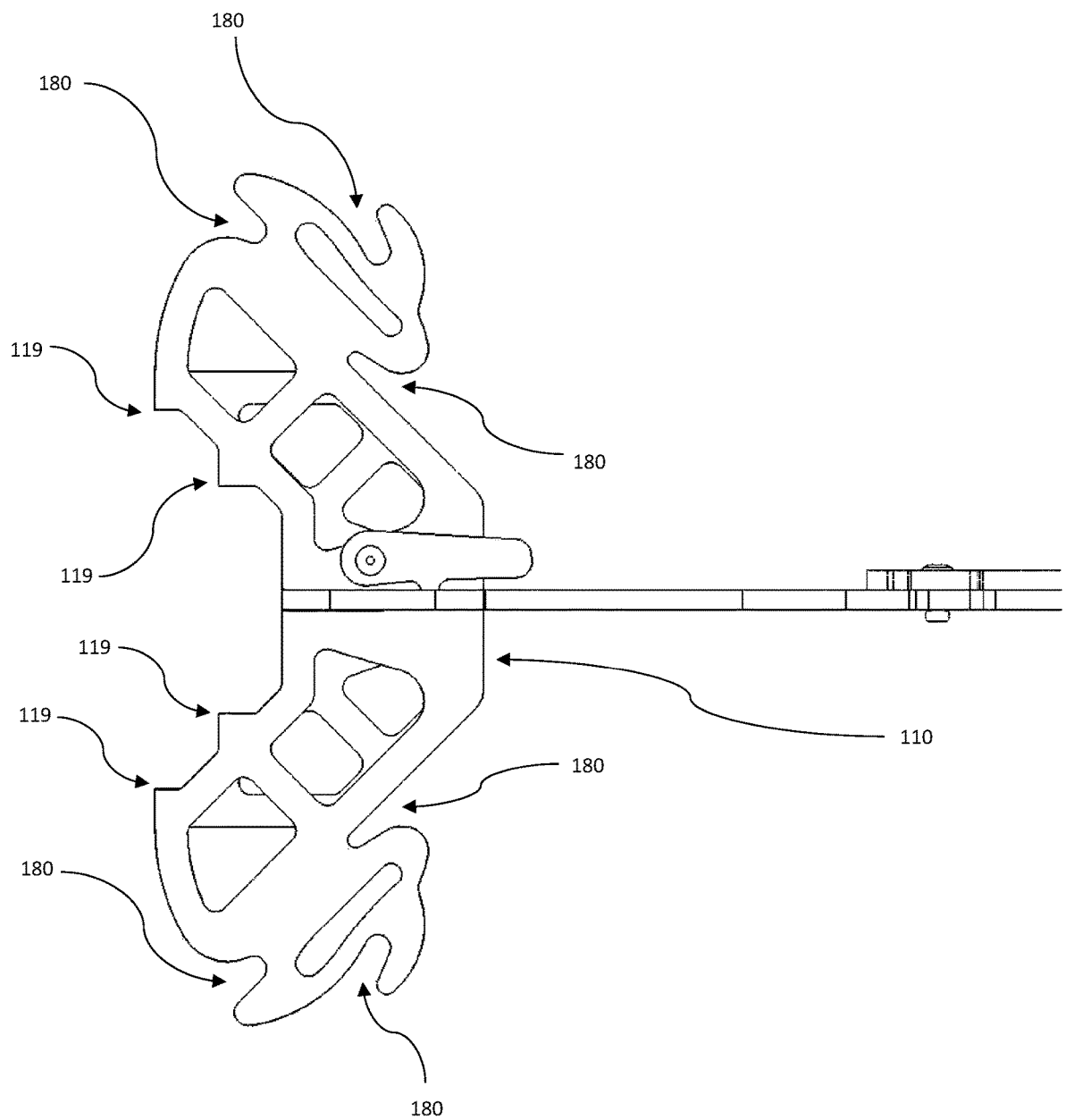
FIG. 5A shows a top view of the bracket after having been assembled.

FIG. 5A shows a top view of the bracket when assembled. An upper rope attachment piece 110 of the bracket comprises multiple slots 180. In this embodiment, the slots 180 have wide entrances and are tapered to become gradually narrower. The slots 180 are oriented in multiple directions, and some of them are oriented in opposite, alternating directions. These slots 180 have a tapered design, which causes a rope which is placed into a slot to wedge in and stay in place if the rope is pulled sufficiently deeply into the slot. The orientation of slots in multiple directions provides extra stability when a rope is wound through multiple slots. An additional feature of the upper rope attachment piece 110 comprises frictional protrusions 119, which can press into whichever tree, pole, or other support object is being used to secure the bracket.

Figure 5B:
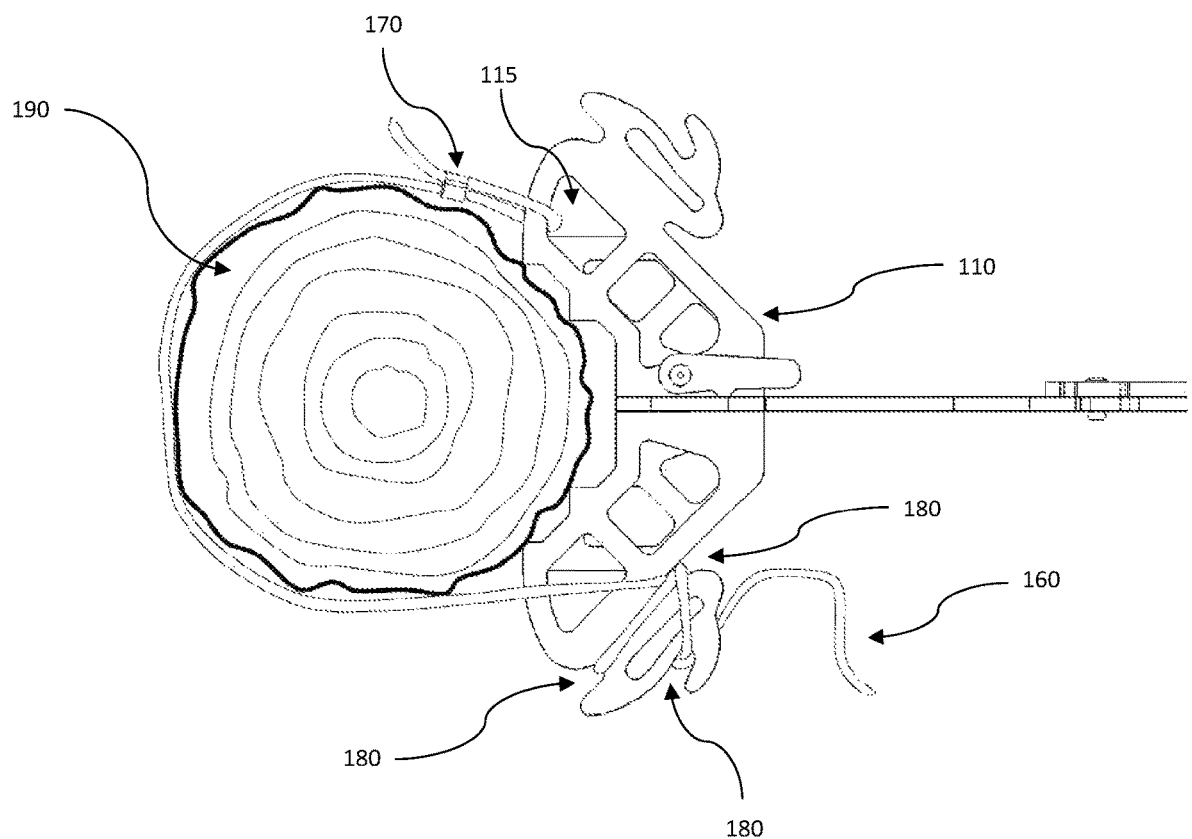
FIG. 5B shows a top view of the bracket after having been assembled and after having been secured to a tree trunk by using a rope.

FIG. 5B shows a top view of the bracket when assembled, with a rope 160 having been wound through slots 180 on an upper rope attachment piece 110; said rope 160 is simultaneously being used to secure the bracket to a tree trunk 190. In this figure, one end of said rope 160 is secured to the upper rope attachment piece 110 by having been threaded through a hole 115, looped, and connected to itself with a clasp 170; however, alternate embodiments are also contemplated where the rope can be secured simply by being wound through slots on both sides of the upper rope attachment piece 110.

Figure 6A:
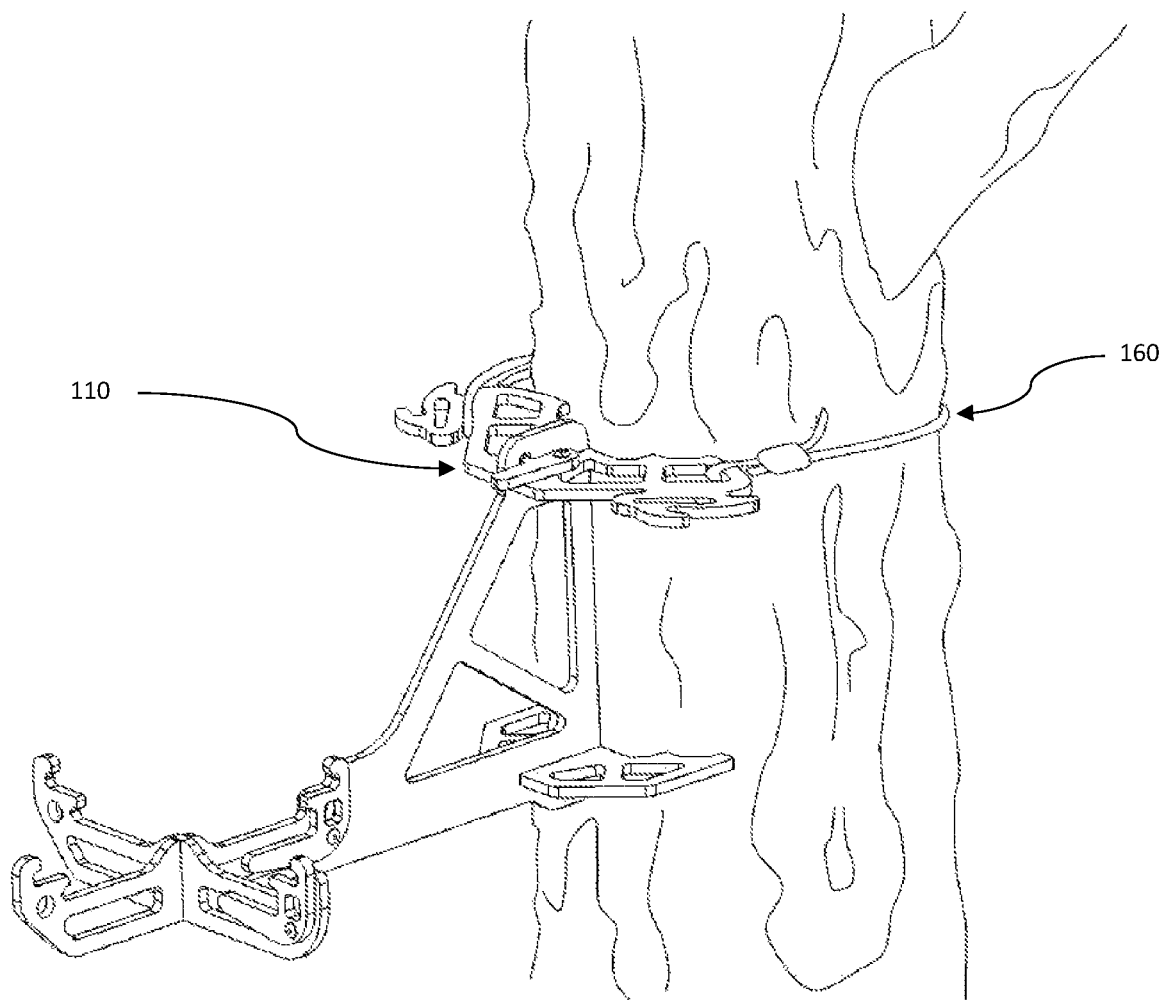
FIG. 6A shows a front perspective view of the bracket after having been assembled and after having been secured to a tree trunk by using a rope.

FIG. 6A shows a front perspective view of the bracket after being secured to a tree trunk. This is accomplished by passing a rope 160 around the tree trunk, and by securing the rope 160 to both sides of an upper rope attachment piece 110, such as by winding the rope 160 through slots on the bracket as shown in FIG. 5B.

Figure 6B:
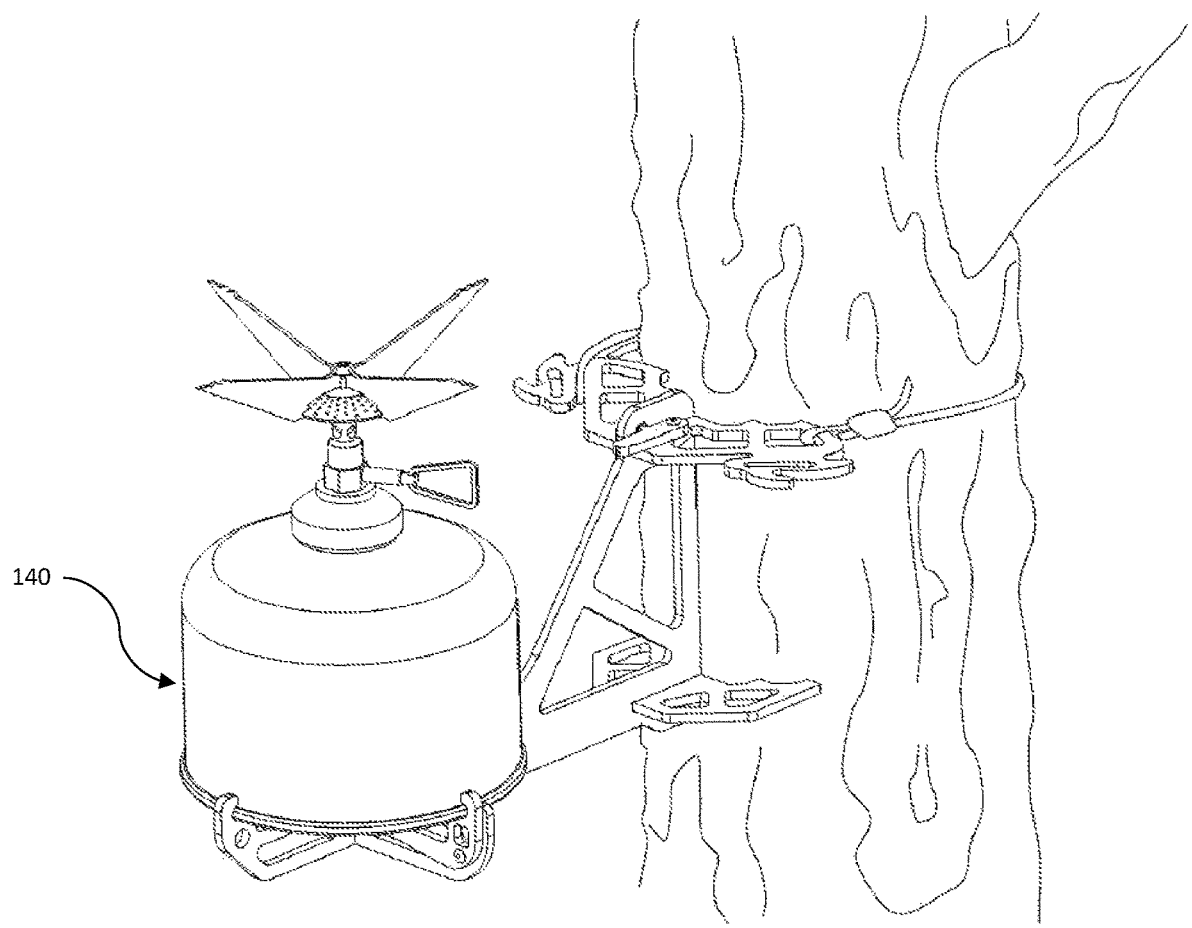
FIG. 6B shows a front perspective view of the bracket, secured to a tree trunk and with a canister stove placed on it.

FIG. 6B shows a front perspective view of the bracket after being secured to a tree trunk and after placing a canister stove 140 on the bracket and locking said canister stove 140 in place, as depicted in FIGS. 4A through 4C.

Figure 6C:
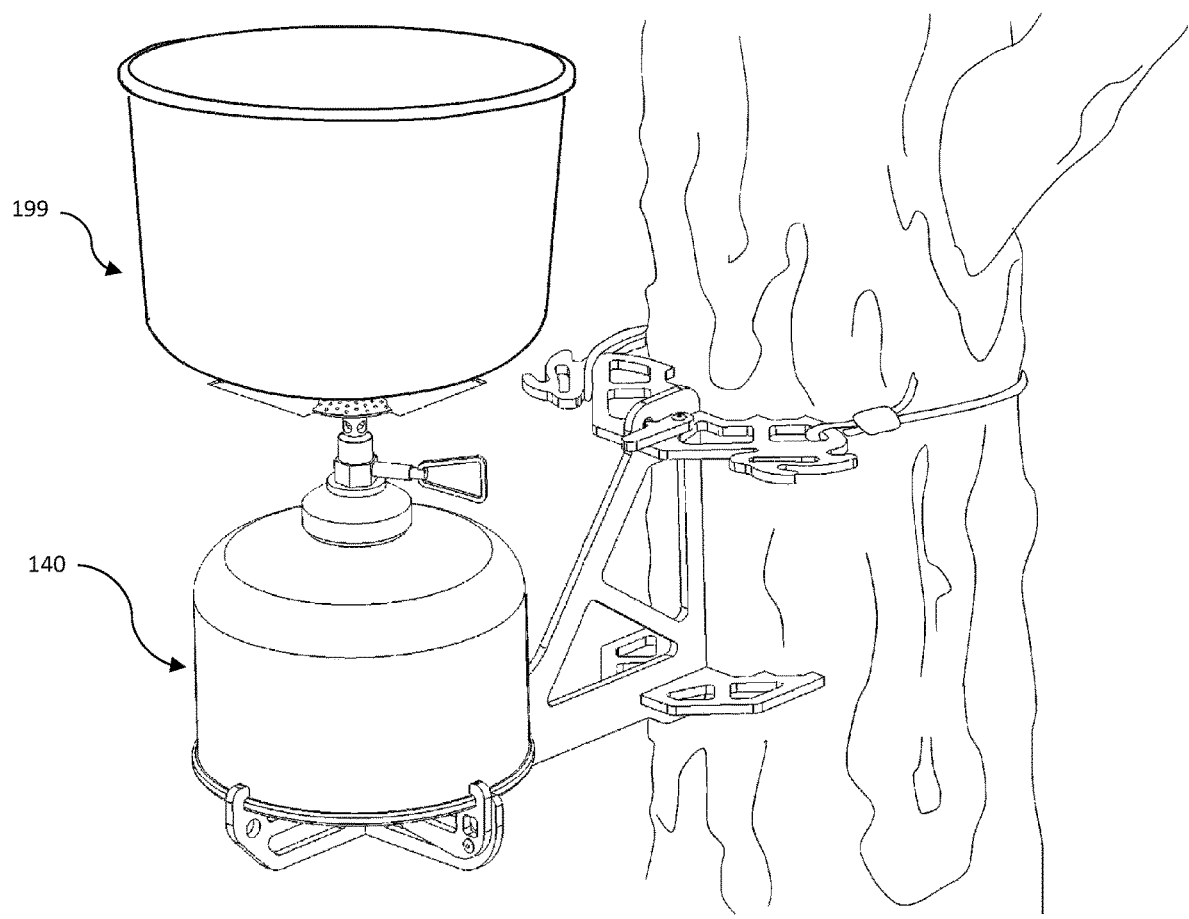

FIG. 6C shows a front perspective view of the bracket and a canister stove 140 with a pot 199 placed on top, secure on the tree trunk and ready for use.

FIGS. 7A through 14 illustrate a second example embodiment of the invention, wherein the invention is implemented in the form of a folding bracket which is capable of folding into a flat configuration.

Figure 7A:
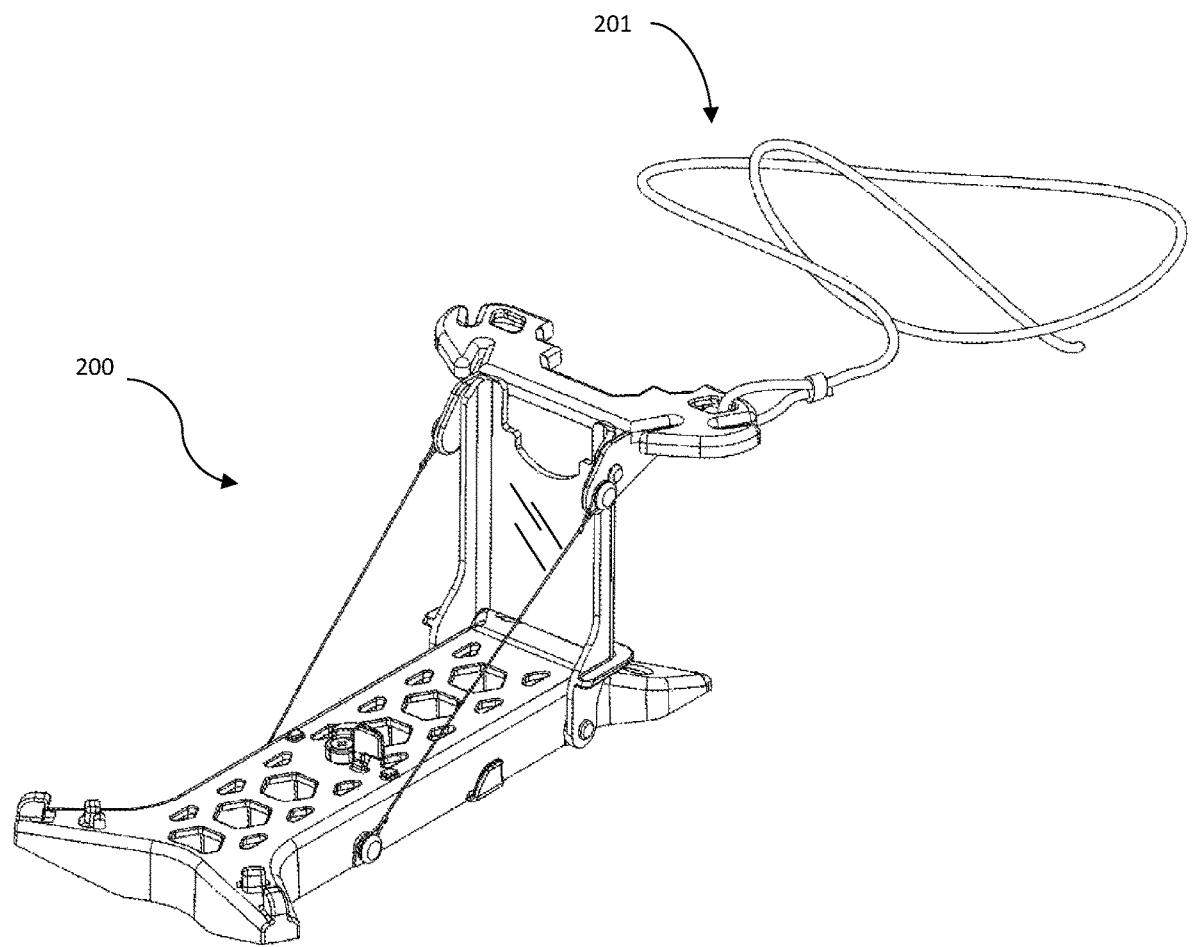

FIG. 7A shows a second example embodiment of a bracket, implemented in the form of a folding bracket 200, shown here in an unfolded configuration with a rope 201 attached.

Figure 7B:
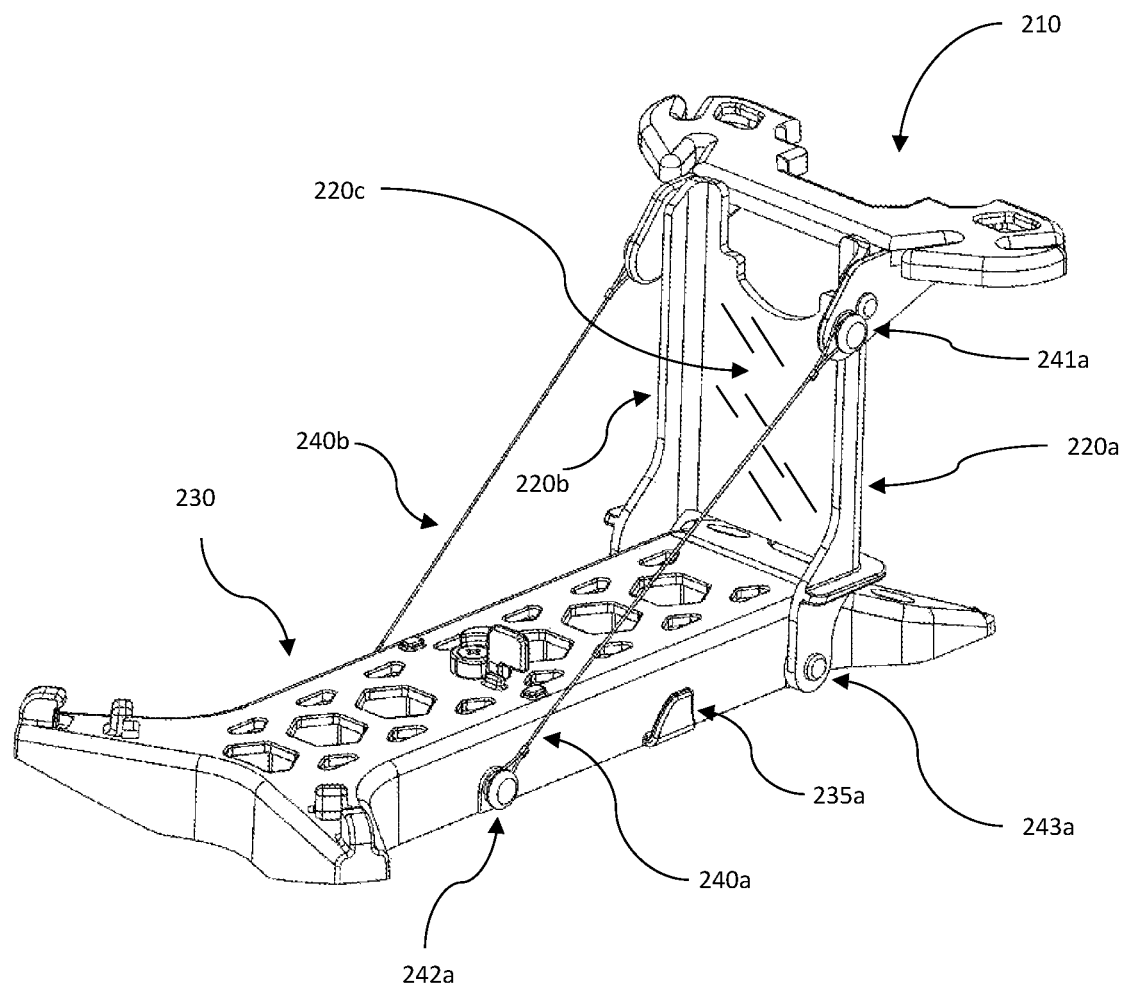
FIG. 7B shows a front perspective view of the folding bracket in an unfolded configuration.

FIG. 7B shows a front perspective view of the folding bracket 200 from FIG. 7A, which comprises an upper attachment piece 210, vertical supports 220a and 220b, and a platform 230. The pictured embodiment also includes an optional, central connection element 220c which links vertical supports 220a and 220b. Components of the folding bracket in this embodiment include a support string 240a, which has been placed on string attachments 241a and 242a. An opposite side of the bracket has a support string 240b which has been placed on two additional string attachments (not pictured). In some embodiments, support strings 240a and 240b are adapted to be removable. In some embodiments, one or more string attachments can be implemented in the form of knobs. The pictured embodiment includes a hinge 243a, and an additional hinge (not pictured) on an oppposite side of the folding bracket; these hinges allow the folding bracket to be switched between folded and unfolded positions. The pictured embodiment also comprises a hook 235a which is suitable for holding an item, such as a portable bag. Some embodiments will include an additional side hook (not pictured) on an opposite side of the folding bracket.

Figure 7C:
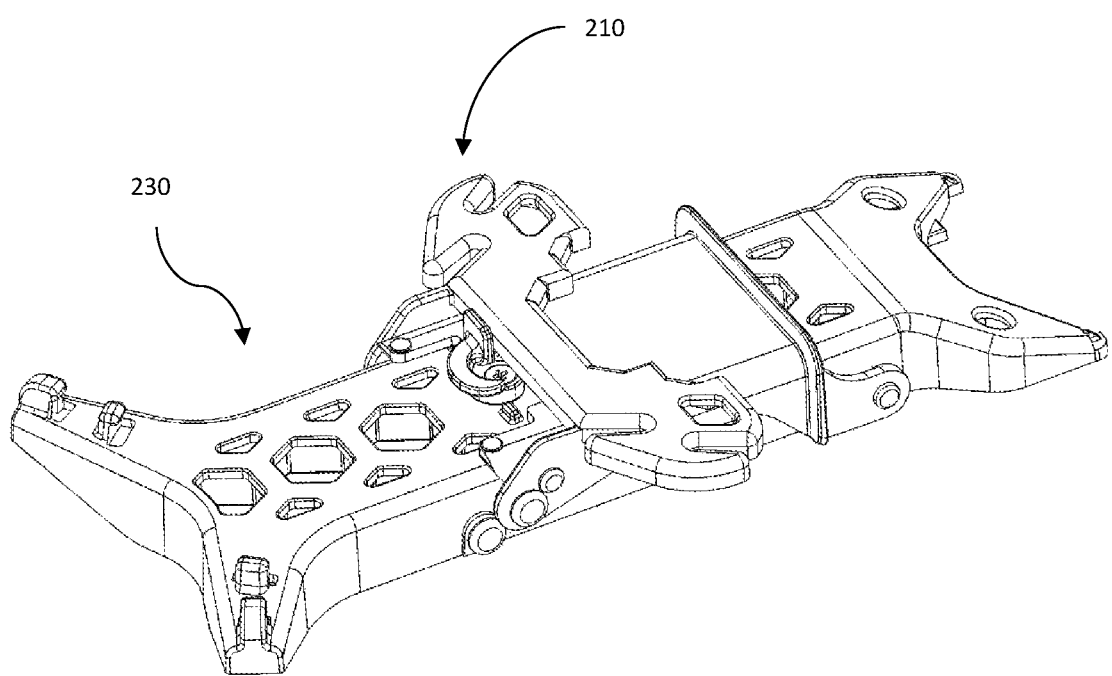
FIG. 7C shows a front perspective view of the folding bracket in a folded configuration.

FIG. 7C shows a front perspective view of the folding bracket in a folded configuration, which includes an upper attachment piece 210 and a platform 230.

Figure 8A:
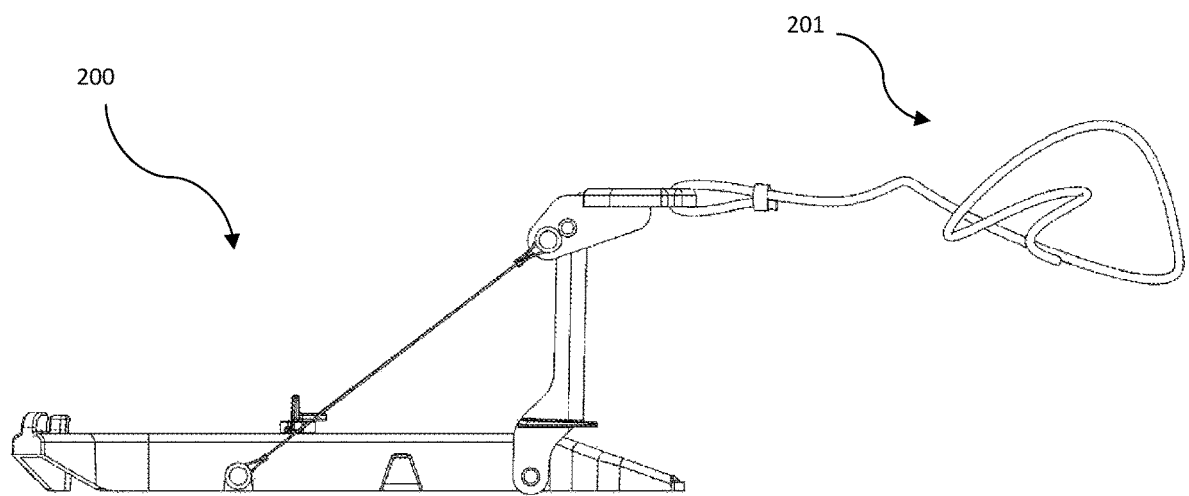
FIG. 8A shows a side view of the folding bracket in an unfolded configuration with a rope attached.

FIG. 8A shows a side view of the folding bracket 200 in an unfolded configuration with a rope 201 attached.

Figure 8B:
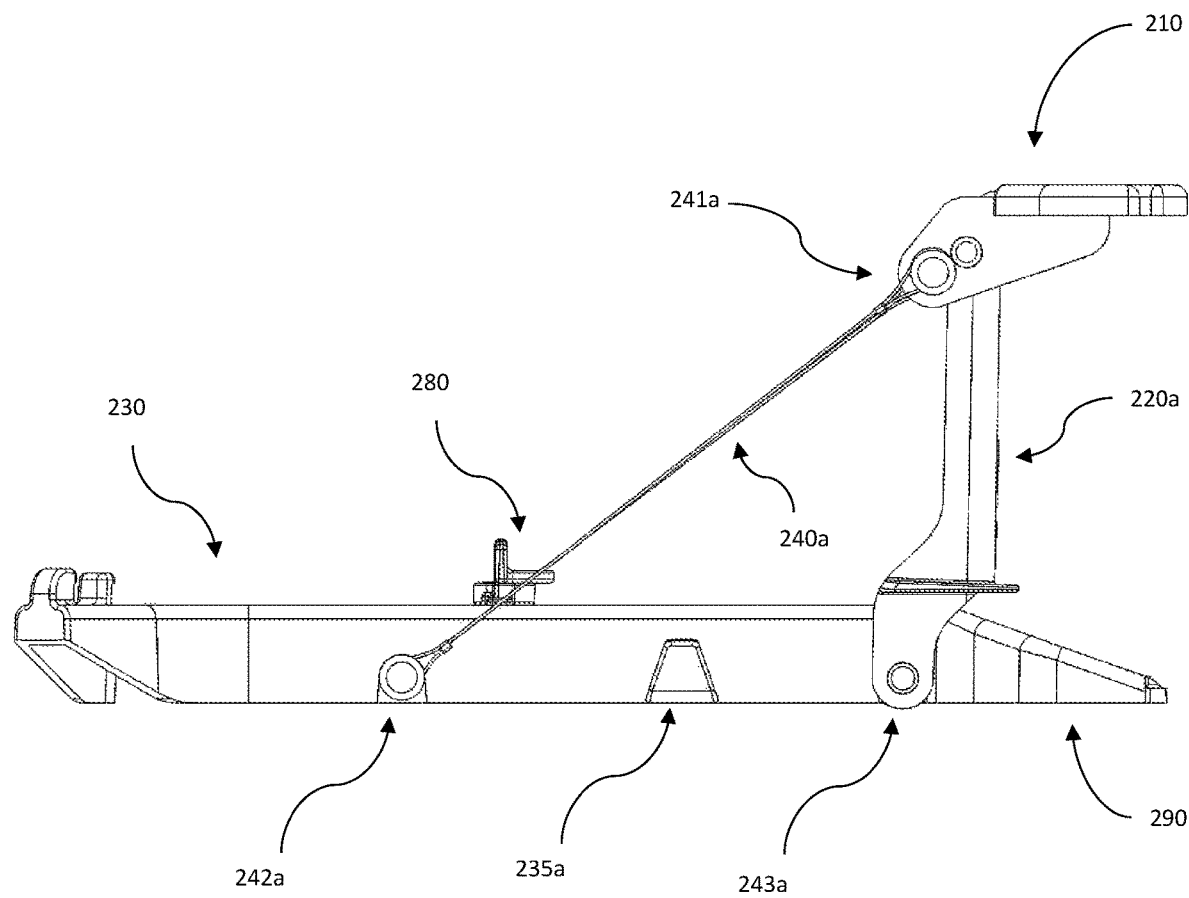
FIG. 8B shows a side view of the folding bracket in an unfolded configuration.

FIG. 8B shows a side view of the folding bracket in an unfolded configuration. In this embodiment, the folding bracket comprises an upper attachment piece 210, a vertical support 220a, a corresponding vertical support 220b (not pictured) on an opposite side, a platform 230, a hook 235a, a support string 240a, an additional corresponding support string 240b (not pictured) on an opposite side, string attachments 241a and 242a, a hinge 243a, a payload latch 280, and a lower frictional gripping component 290.

Figure 8C:
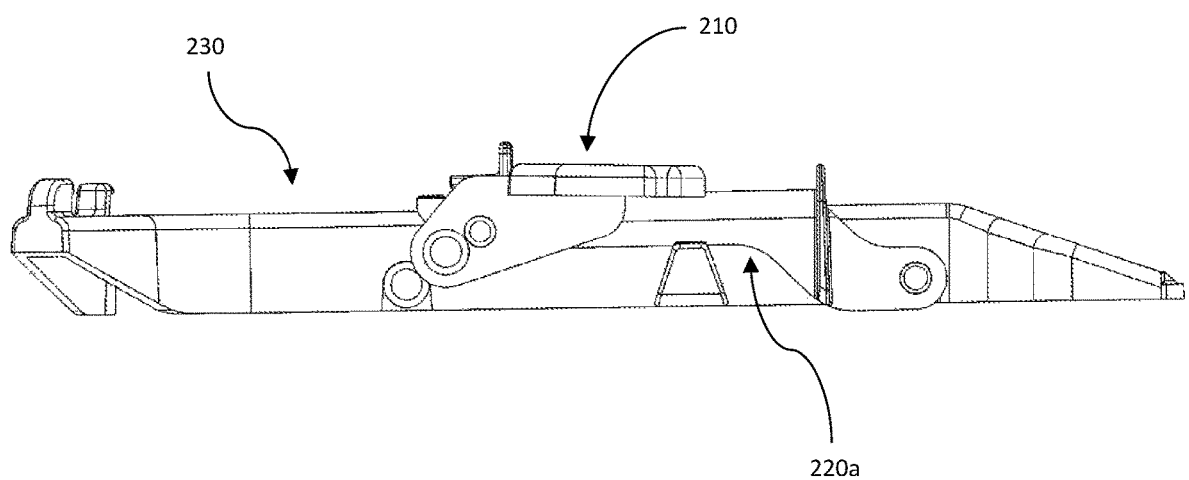
FIG. 8C shows a side view of the folding bracket in a folded configuration.

FIG. 8C shows a side view of the folding bracket in a folded configuration, which includes an upper attachment piece 210, a vertical support 220a, a corresponding vertical support 220b (not pictured) on an opposite side, and a platform 230.

Figure 9A:
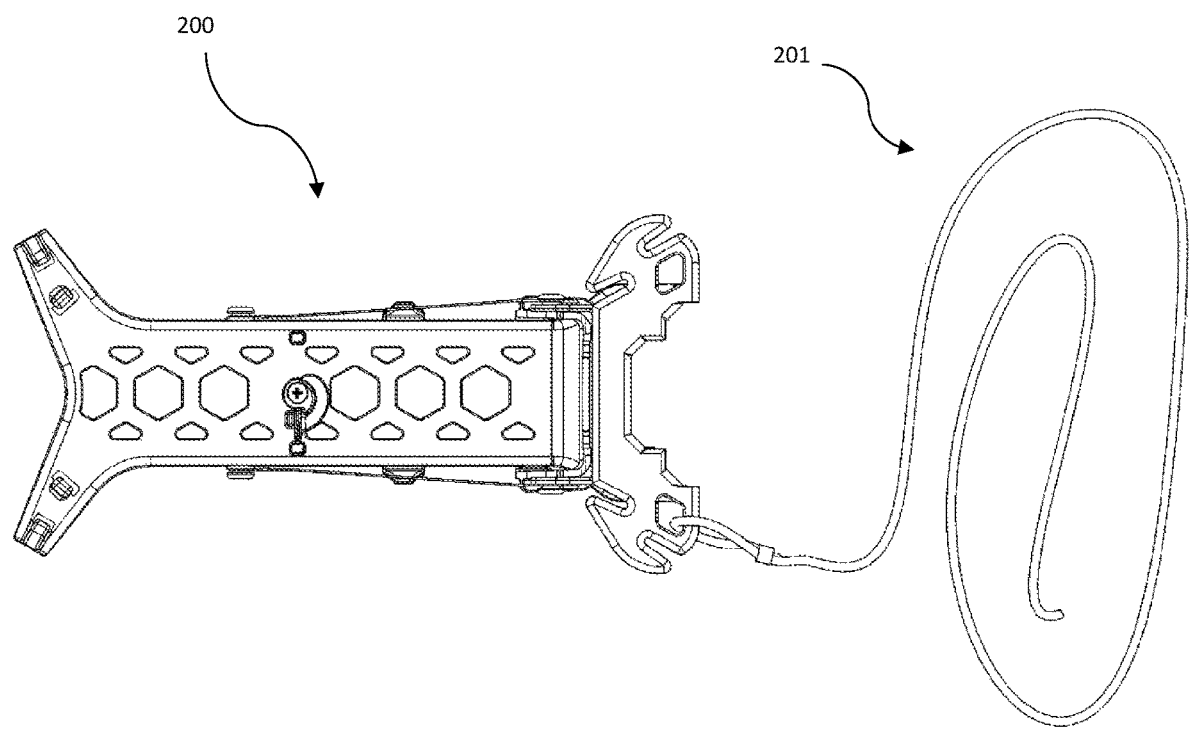
FIG. 9A shows a top view of the folding bracket in an unfolded configuration with a rope attached.

FIG. 9A shows a top view of folding bracket 200 in an unfolded configuration with a rope 201 attached.

Figure 9B:
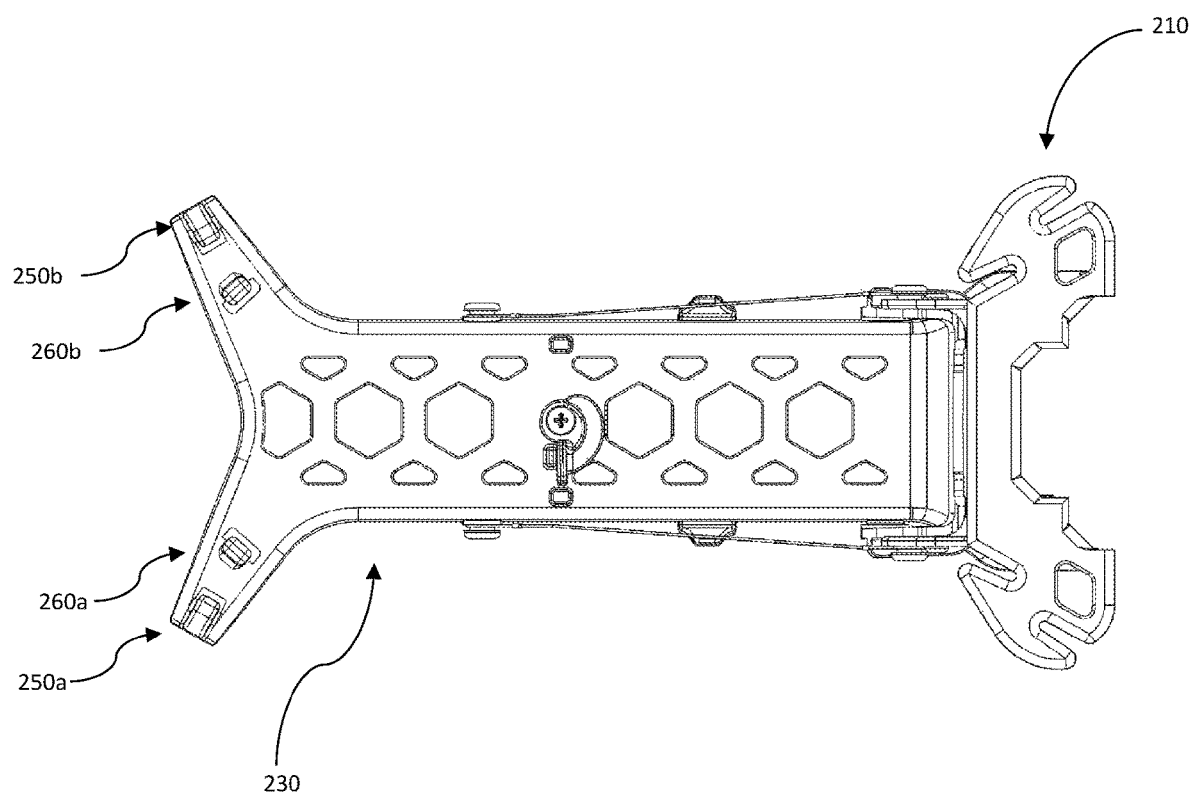
FIG. 9B shows a top view of the folding bracket in an unfolded configuration.

FIG. 9B shows a top view of the folding bracket in an unfolded configuration, said folding bracket comprising upper attachment piece 210 and platform 230. The folding bracket also comprises outer barriers 250a and 250b, as well as inner barriers 260a and 260b. The outer barriers 250a and 250b are positioned to interface with a larger payload, and the inner barriers 260a and 260b are positioned to interface with a smaller payload. In the embodiment shown, the outer barriers 250a and 250b and the inner barriers 260a and 260b take the form of notches, which are adapted to interface with fuel canisters of camping stoves.

Figure 10A:
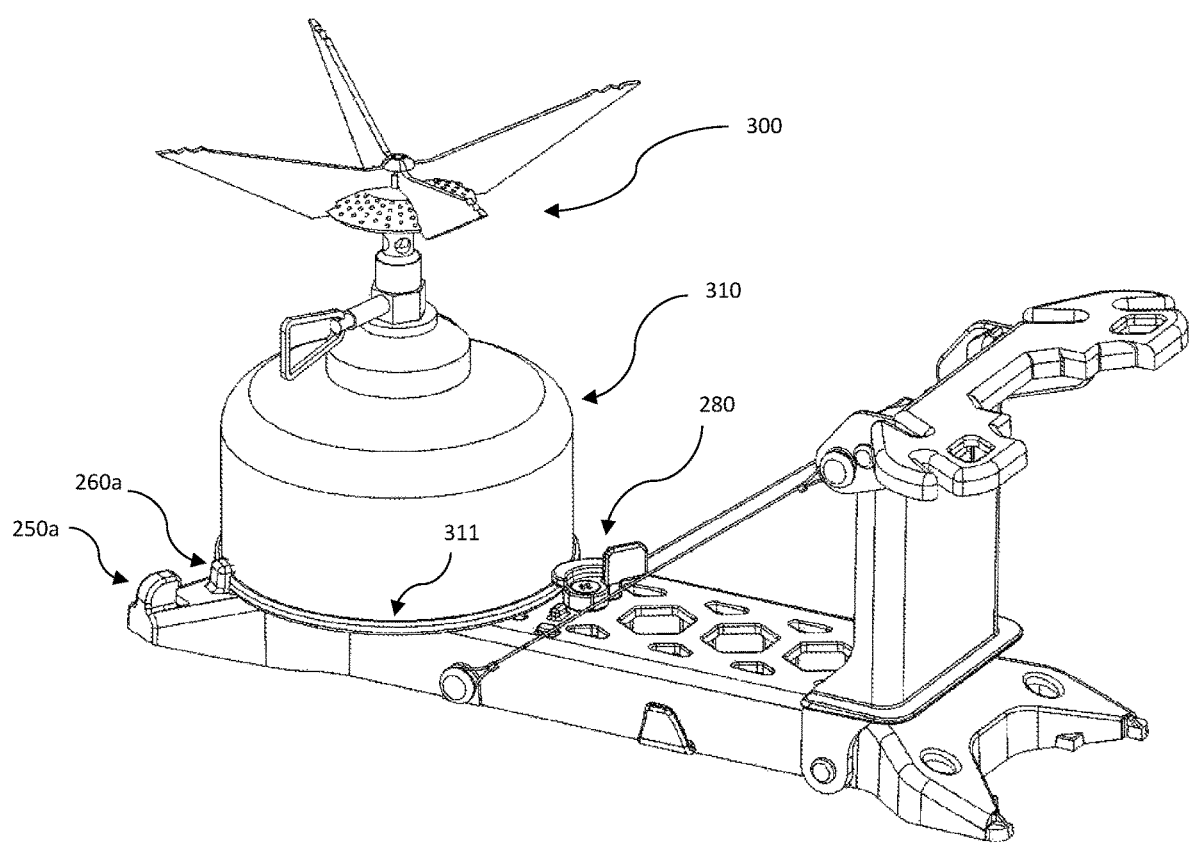
FIG. 10A shows a rear perspective view of the folding bracket with a small stove fuel canister placed on it.

FIG. 10A shows a rear perspective view of the folding bracket with a small stove fuel canister placed on it. In this view, a stove attachment 300 is attached to a small fuel canister 310, which in turn is secured by a payload latch 280 and by inner barriers 260b (not pictured) and 260a. In the embodiment shown, these inner barriers take the form of notches which surround a lower rim 311 of the small fuel canister 310.

Figure 10B:
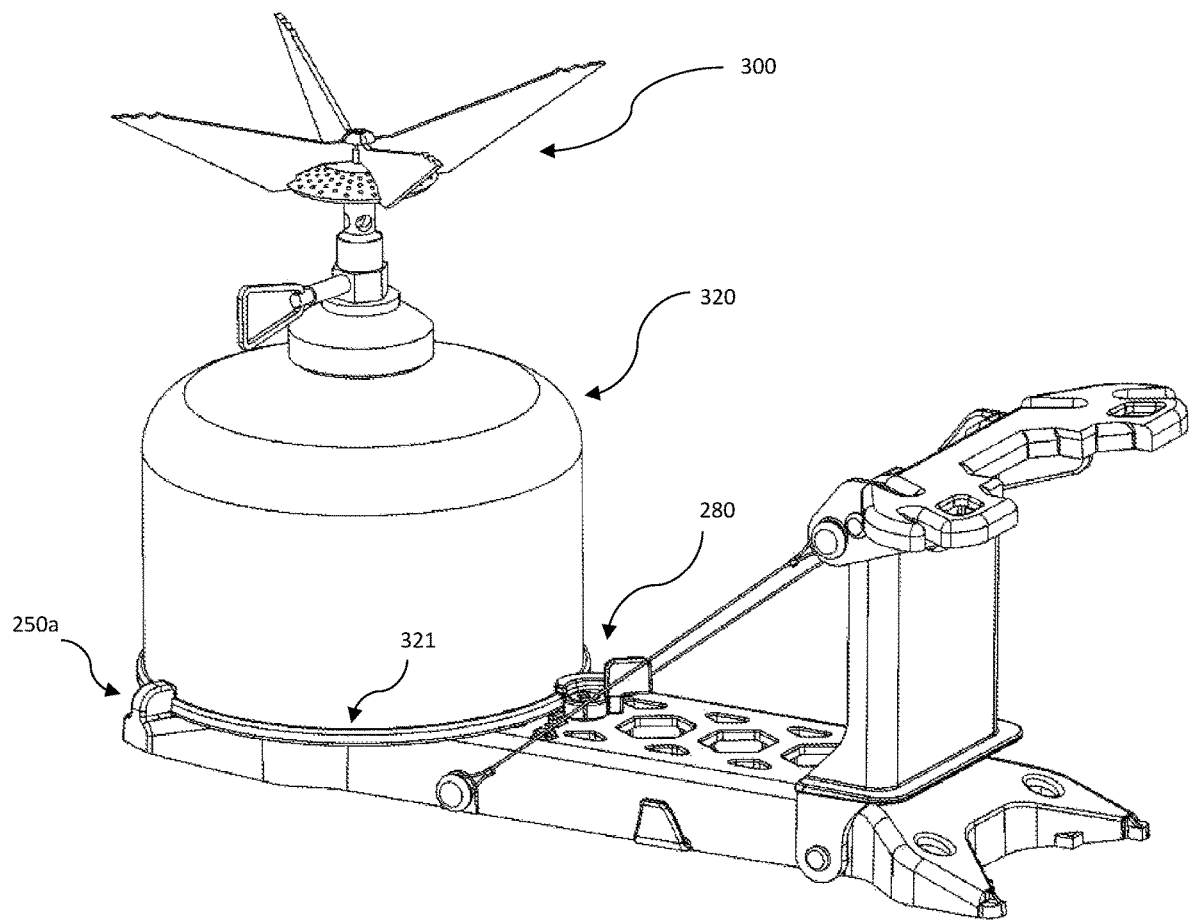
FIG. 10B shows a rear perspective view of the folding bracket with a large stove fuel canister placed on it.

FIG. 10B shows a rear perspective view of the folding bracket with a large stove fuel canister placed on it. In this view, a stove attachment 300 is attached to a large fuel canister 320, which in turn is secured by a payload latch 280 and by outer barriers 250b (not pictured) and 250a. In the embodiment shown, these outer barriers take the form of notches which surround a lower rim 321 of the small fuel canister 320.

Figure 11A:
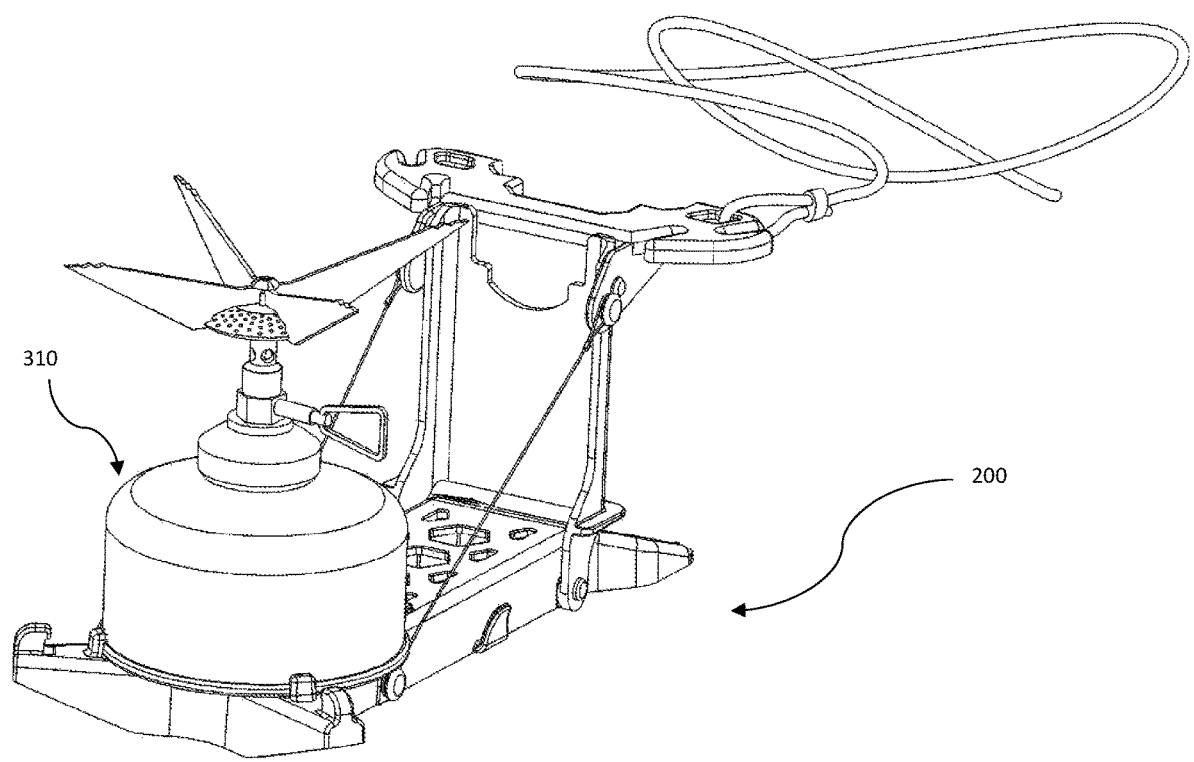
FIG. 11A shows a front perspective view of the folding bracket with a small stove fuel canister placed on it.

FIG. 11A shows a front perspective view of the folding bracket 200 with a small fuel canister 310 placed on it.

Figure 11B:
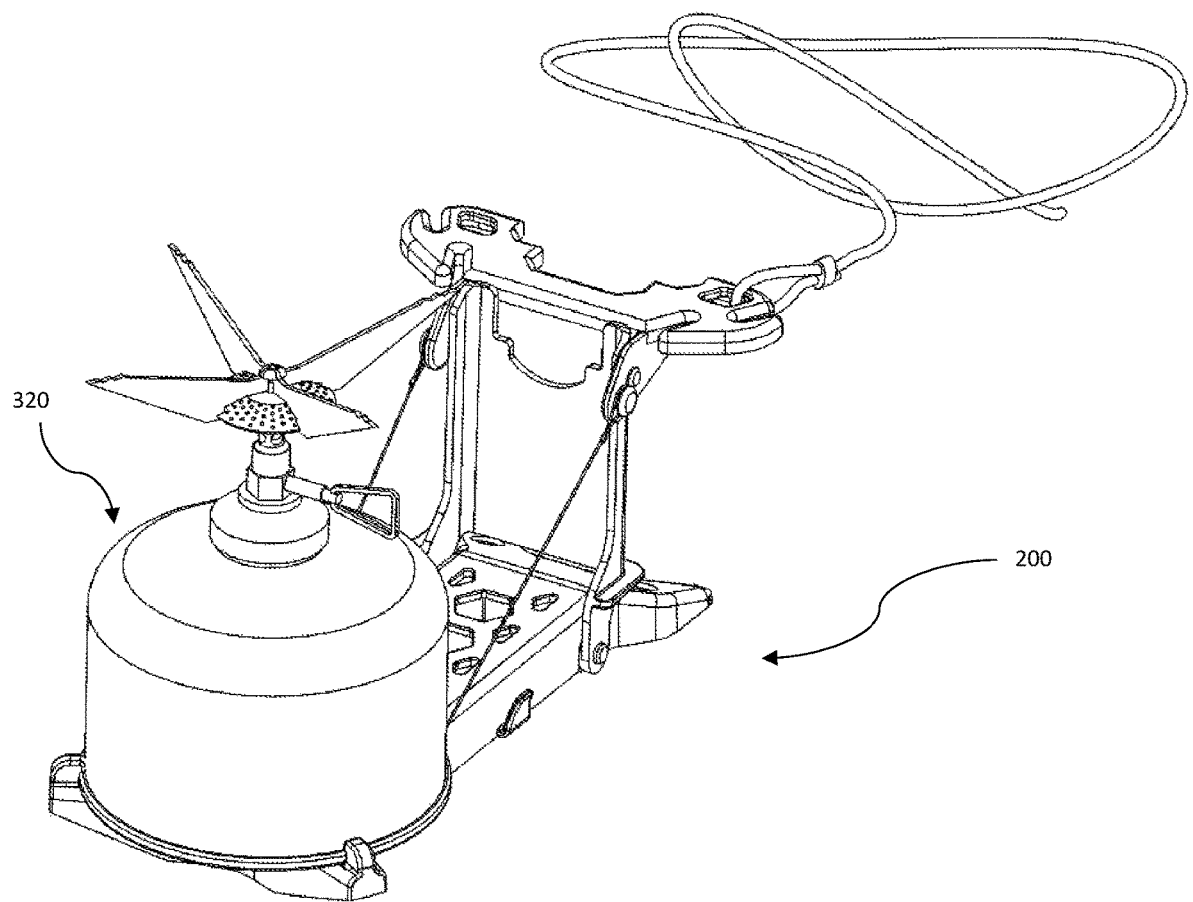
FIG. 11B shows a front perspective view of the folding bracket with a large stove fuel canister placed on it.

FIG. 11B shows a front perspective view of the folding bracket 200 with a large fuel canister 320 placed on it.

Figure 12:
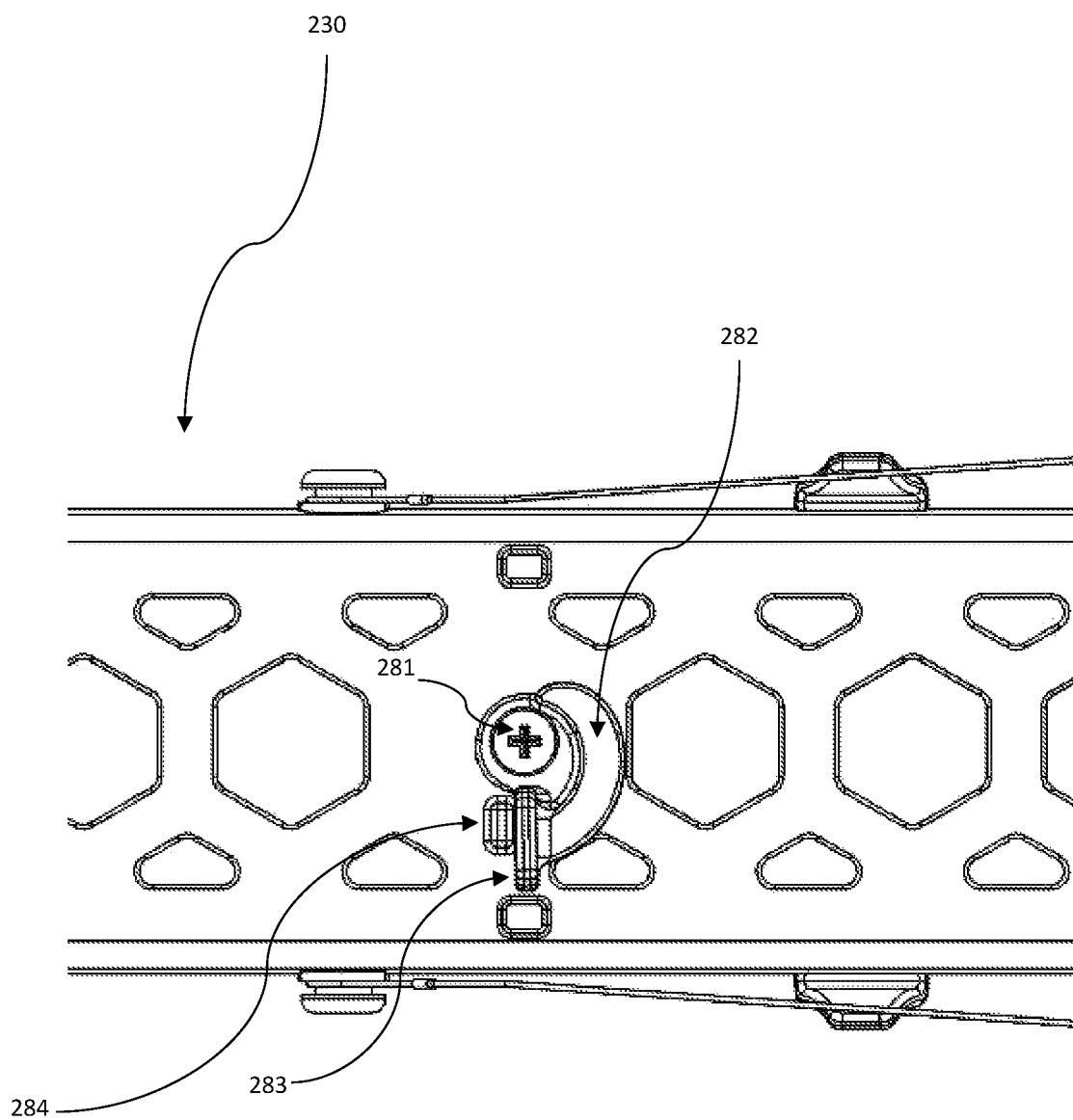

FIG. 12 shows a top view of a payload latch 280 positioned on a platform 230 of the folding bracket. In the embodiment shown, the payload latch comprises a central hinge 281, a cam component 282, and a tab 283. In the embodiment shown, the platform 230 comprises an optional motion stopper 284 which is adapted to block motion of the tab 283 and prevent payload latch rotation past that point.

Figure 13A:
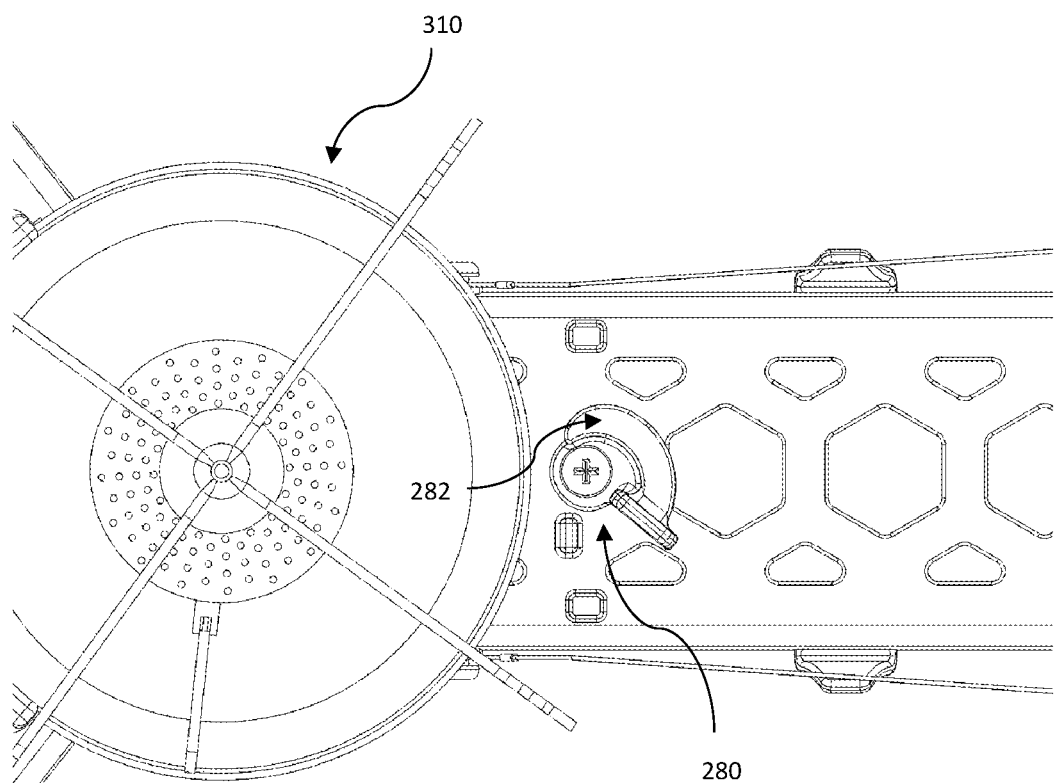
FIG. 13A shows a top view of the folding bracket with a payload of a camping stove fuel canister, as well as a payload latch in an open position.

FIG. 13A shows a top view of the folding bracket, showing a payload of a fuel canister 310, and a payload latch 280 (comprising cam component 282) which is in an open position.

Figure 13B:
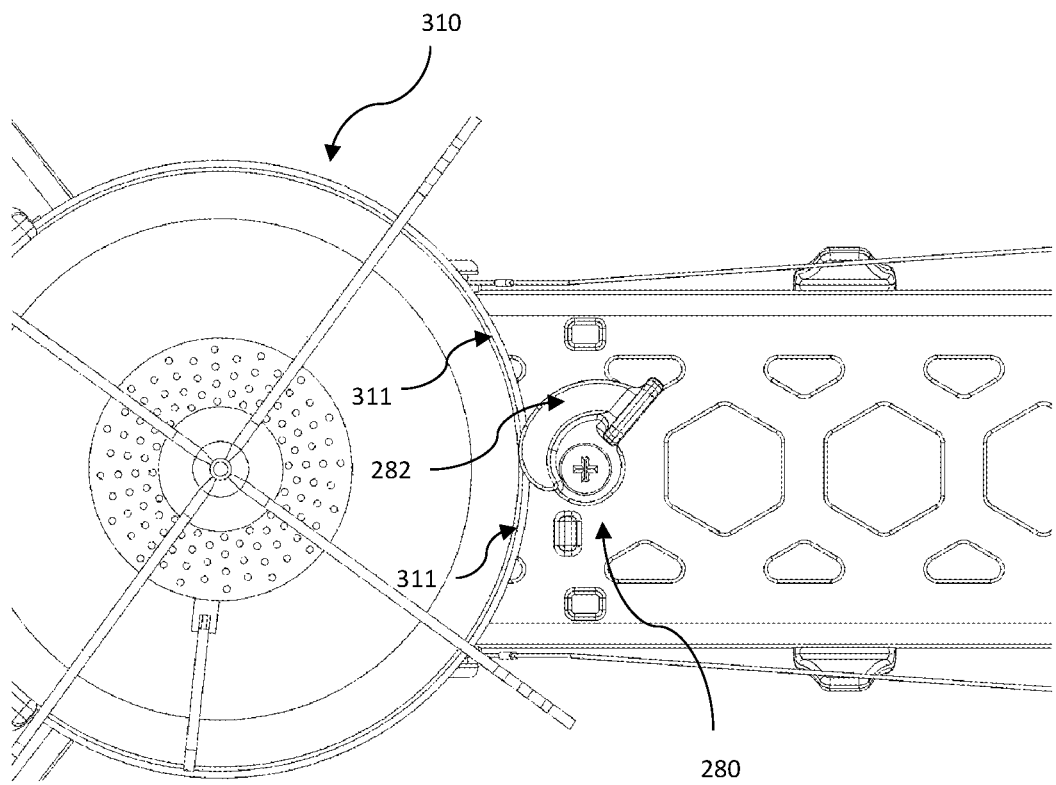
FIG. 13B shows a top view of the folding bracket with a payload of a camping stove fuel canister, as well as a payload latch in a closed position.

FIG. 13B shows a top view of the folding bracket, showing a payload of a fuel canister 310, and a payload latch 280 which has been rotated into a closed position. After being rotated, a cam component 282 of the payload latch 280 becomes positioned above a lower rim 311 of fuel canister 310, and also presses against a side of fuel canister 310. It will be appreciated that cam component 282 can engage payloads of different sizes and/or different positions, depending on how far the payload latch 280 is rotated.

Figure 14A:
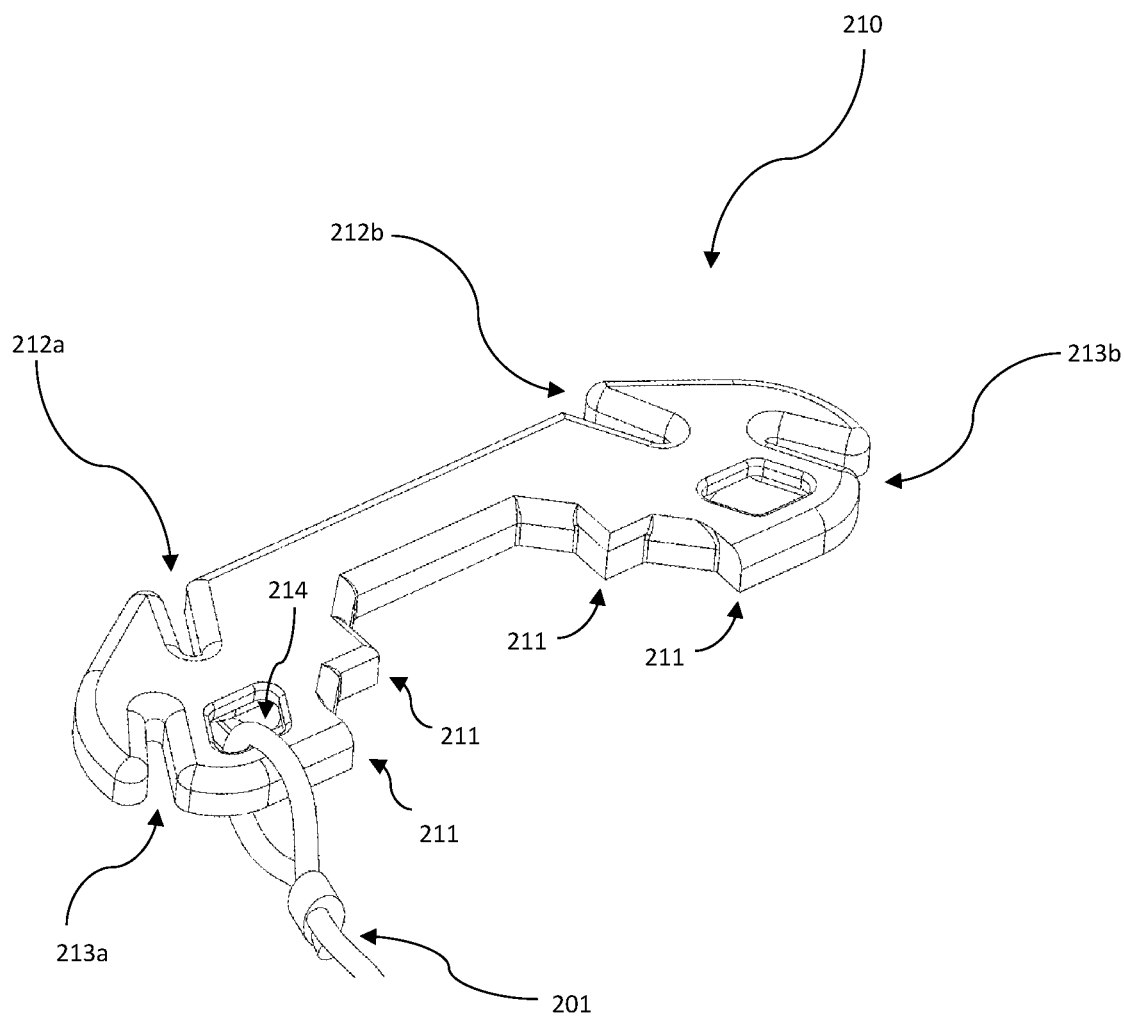
FIG. 14A shows a perspective detail view of an upper attachment piece of the folding bracket.

FIG. 14A shows a perspective detail view of the upper attachment piece 210 and an accompanying rope 201, in which the upper attachment piece has been separated from the rest of the folding bracket. In this embodiment, the upper attachment piece 210 comprises frictional teeth 211. In this embodiment, slots 212a and 212b are positioned on a front side of upper attachment piece 210, while slots 213a and 213b are positioned on a rear side of upper attachment piece 210 and are oriented in alternating, opposite directions from slots 212a and 212b. In this detail view, rope 201 is secured to a hole 214 in upper attachment piece 210, and is capable of being wound through and/or wedged into one or more of the slots.

Figure 14B:
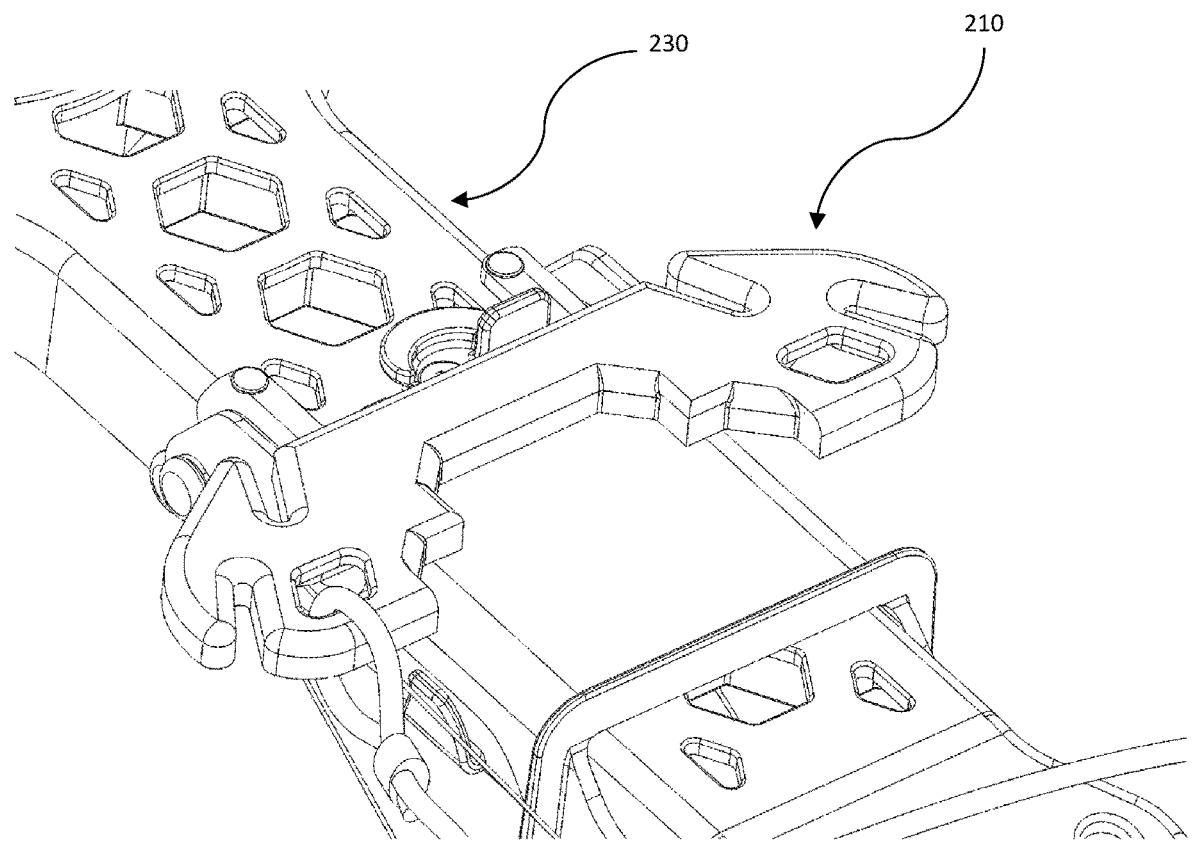
FIG. 14B shows a rear perspective view of the folding bracket in a folded position.

FIG. 14B shows a rear perspective view of the folding bracket, comprising upper attachment piece 210 and platform 230, when configured in a folded position.

Figure 14C:
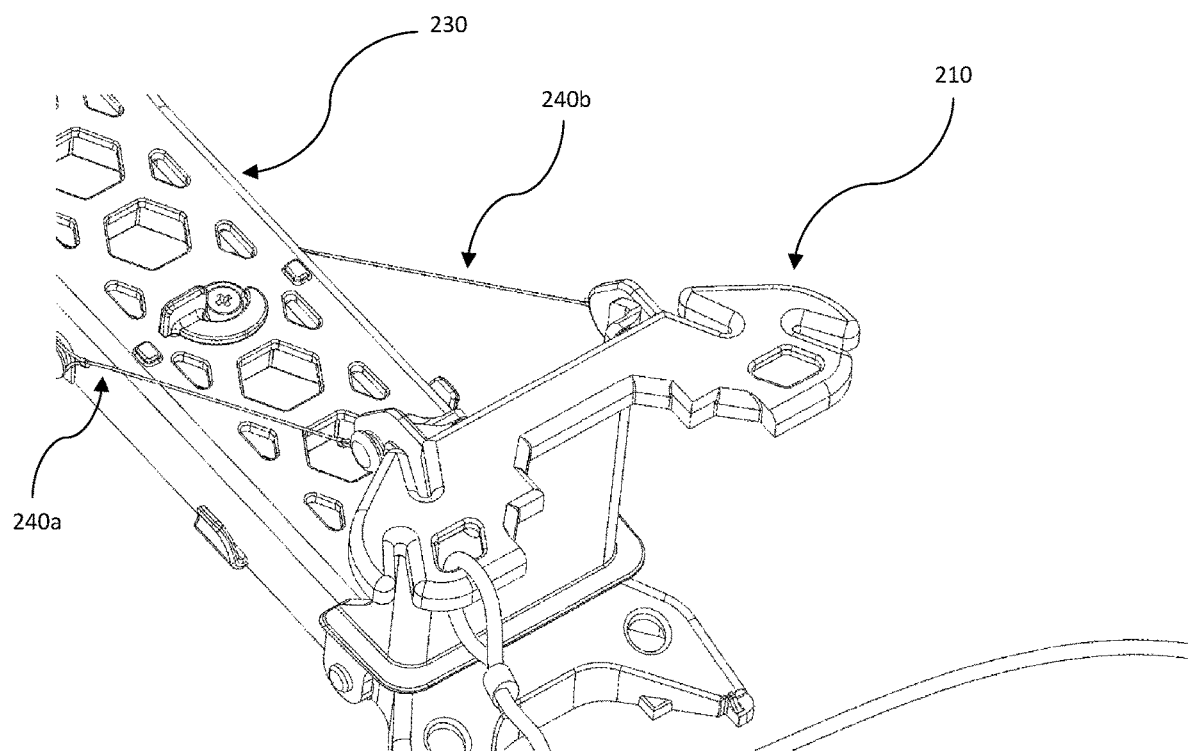
FIG. 14C shows a rear perspective view of the folding bracket in an unfolded position.

FIG. 14C shows a rear perspective view of the folding bracket, comprising upper attachment piece 210 and platform 230, after having been unfolded and fitted with securing strings 240a and 240b.

Figure 15:
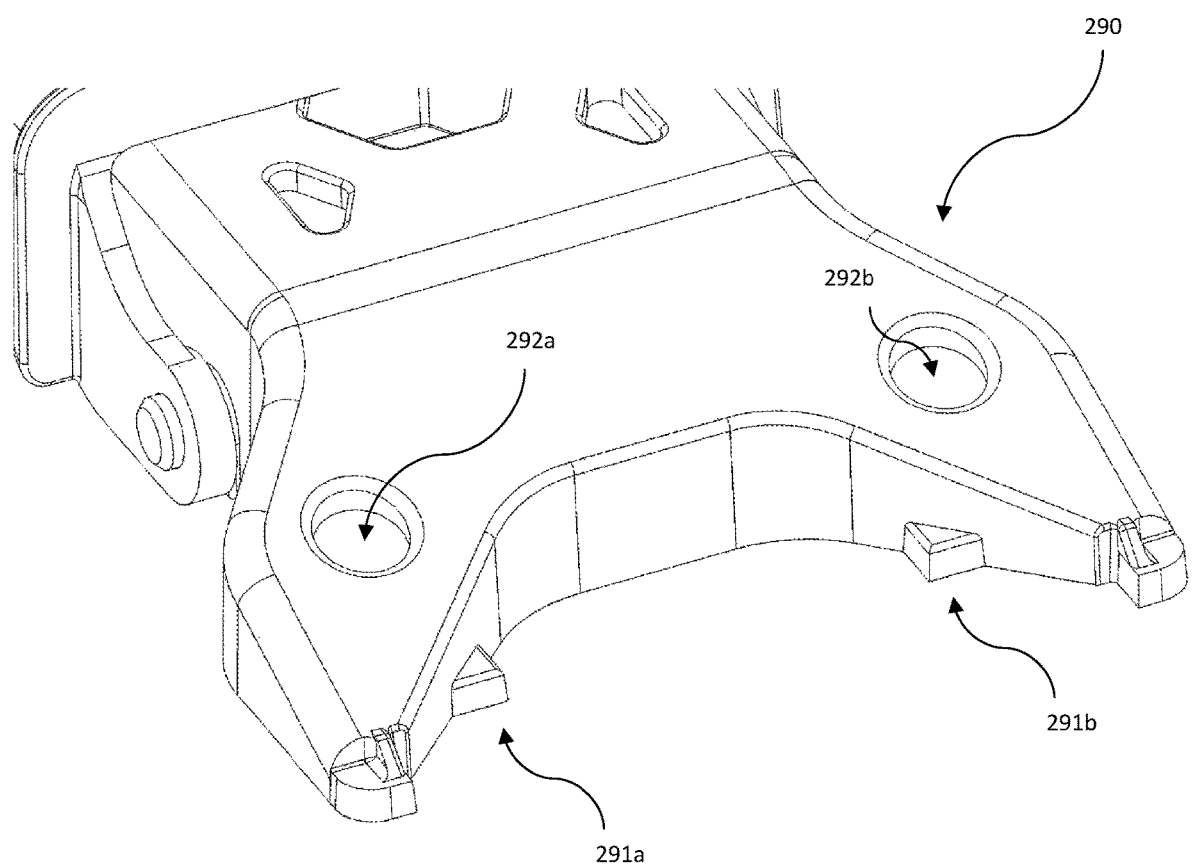

FIG. 15 shows a top rear perspective view of a lower frictional gripping component 290 of the folding bracket, said lower frictional gripping component 290 comprising protrusions 291a and 291b which assist with the folding bracket's capacity to grip a tree, a post, or another support object (not pictured). In this embodiment, the lower frictional gripping component 290 also comprises holes 292a and 292b, through which a rope or cord (not pictured) can optionally be placed in order to help secure the folding bracket to a support object.

I claim:

1. A method of latching a canister stove or other payload onto a payload-holding device, comprising the steps of:
    positioning a payload against a set of one or more payload barriers, and
    engaging a payload latch which secures the payload,
    wherein one or more payload barriers take the shape of notches,
    wherein the payload latch is engaged through rotation, and
    wherein the payload latch is engaged by rotating said payload latch around a hinge.

\* \* \* \* \*